United States Patent
Yang et al.

(10) Patent No.: US 12,398,046 B2
(45) Date of Patent: Aug. 26, 2025

(54) EXTRACTION SYSTEM, EXTRACTION METHOD FOR SEPARATING MAGNESIUM AND EXTRACTING LITHIUM AND BORON FROM MAGNESIUM-CONTAINING BRINE WITH COMPLEX SOLVENT OF SECONDARY AMIDE/ALKYL ALCOHOL AS WELL AS APPLICATIONS THEREOF

(71) Applicant: XIANGTAN UNIVERSITY, Hunan (CN)

(72) Inventors: Lixin Yang, Hunan (CN); Qinyao Zhou, Hunan (CN); Qianling Xie, Hunan (CN); Cong Li, Hunan (CN); Chang Liu, Hunan (CN); Haibo Li, Hunan (CN)

(73) Assignee: XIANGTAN UNIVERSITY, Hunan (CN)

( * ) Notice: Subject to any disclaimer, the term of this patent is extended or adjusted under 35 U.S.C. 154(b) by 727 days.

(21) Appl. No.: 17/577,065

(22) Filed: Jan. 17, 2022

(65) Prior Publication Data
US 2022/0135416 A1 May 5, 2022

Related U.S. Application Data

(63) Continuation-in-part of application No. PCT/CN2020/079078, filed on Mar. 13, 2020.

(51) Int. Cl.
| | | |
|---|---|---|
| *C01D 15/08* | (2006.01) | |
| *C01B 35/10* | (2006.01) | |
| *C01D 15/04* | (2006.01) | |
| *C22B 3/26* | (2006.01) | |
| *C22B 26/12* | (2006.01) | |
| *C22B 26/22* | (2006.01) | |
| *C25B 1/34* | (2006.01) | |

(52) U.S. Cl.
CPC ........... *C01D 15/08* (2013.01); *C01B 35/1081* (2013.01); *C01D 15/04* (2013.01); *C22B 3/26* (2021.05); *C22B 26/12* (2013.01); *C22B 26/22* (2013.01); *C25B 1/34* (2013.01)

(58) Field of Classification Search
CPC .......... C01D 15/08; C01D 15/04; C22B 3/26; C22B 26/12; C01B 35/1081; C25B 1/34
See application file for complete search history.

(56) References Cited

FOREIGN PATENT DOCUMENTS

CN 103055539 B * 5/2015

* cited by examiner

*Primary Examiner* — Yong L Chu
(74) *Attorney, Agent, or Firm* — Li & Cai Intellectual Property (USA) Office

(57) ABSTRACT

The extraction system contains secondary amides and alkyl alcohols which are separately used as the extractants for extracting lithium and boron and consist of a single compound or a mixture of two or more compounds, and the total number of carbon atoms in their molecules are 12~18 and 8~20 respectively; the extraction system has a freezing point less than 0° C. With a volume ratio of an organic phase and a brine phase being 1~10:1, at a brine density of 1.25~1.38 g/cm$^3$, at a brine pH value of 0~7 and at a temperature of 0~50° C., a single-stage or multi-stage countercurrent extraction and a stripping are conducted to obtain a water phase with a low magnesium-lithium ratio, which is subjected to concentration, impurity removal and preparation to get lithium chloride, lithium carbonate, lithium hydroxide and boric acid respectively. Water is used for stripping, greatly reducing the consumption of acid and base.

6 Claims, 1 Drawing Sheet

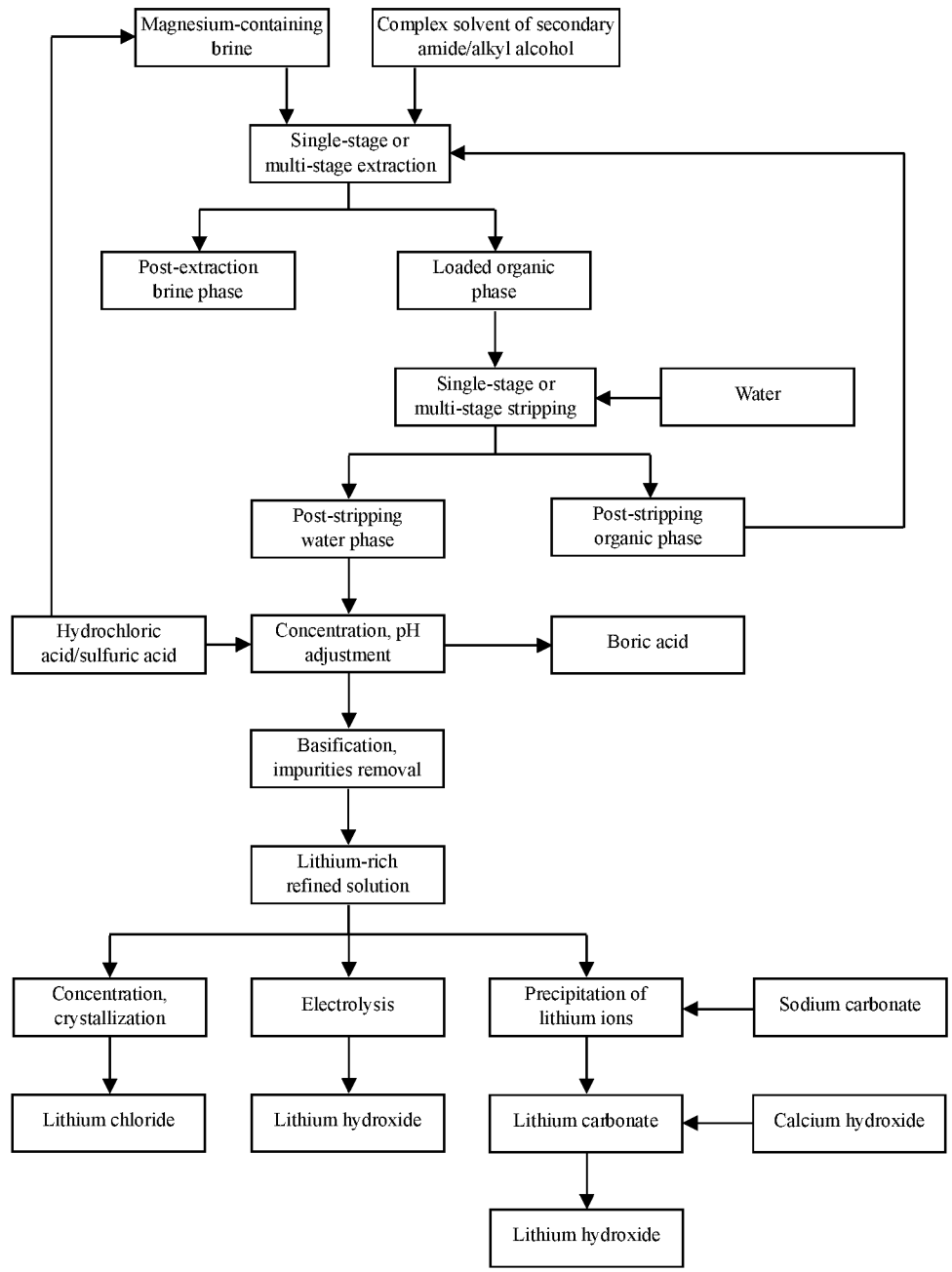

EXTRACTION SYSTEM, EXTRACTION METHOD FOR SEPARATING MAGNESIUM AND EXTRACTING LITHIUM AND BORON FROM MAGNESIUM-CONTAINING BRINE WITH COMPLEX SOLVENT OF SECONDARY AMIDE/ALKYL ALCOHOL AS WELL AS APPLICATIONS THEREOF

TECHNICAL FIELD

The disclosure relates to a method for extracting lithium and boron from magnesium-containing brine, and specifically relates to an extraction system and an extraction method form separating magnesium and extracting lithium and boron from magnesium-containing brine with a complex solvent, as well as applications thereof.

BACKGROUND

In recent years, lithium has been known as the new "gold" and honored as the "white petroleum" of the 21$^{st}$ century. As the basic materials in the field of new energy, the demand on lithium is increasing day by day. Boron is widely used in light-duty daily chemicals, glass and ceramics, metallurgy, medicine, electromechanicals, electronics, nuclear industry and agriculture. There are abundant lithium and boron resources in salt lake brine in the Chaidamu basin of Qinghai province, attracting people's attention for a long time. For brines with boron content greater than 0.3%, an acidizing and cooling crystallization process is employed to produce boric acid, in the meantime are obtained brines containing low concentrations of lithium and boron, from which lithium and boron are then extracted. The process can be divided into three cases: (1) firstly extracting boron without extracting lithium, for example, Li Lijuan et, al. utilized monohydric alcohols of C12-C20 to separate boric acid from magnesium-containing salt lake brine (CN108017067A), Shi Xianqiao et, al. utilized a mixed extractant of isooctanol/2-octanol/kerosene to deeply remove boron from the lithium-containing brine until the content of boron in the water phase was reduced to 10 ppm (CN107459163A); (2) firstly extracting lithium without extracting boron, for example, Xie Chao et, al. proposed a process in which the magnesium sulfate subtype salt lake raw water was subjected to nanofiltration separation, evaporation concentration and lower alcohol solvent-out crystallization to prepare lithium chloride (CN108358221A), Ouyang Hongyong et, al. proposed a process in which halide salt in solid phase was extracted with an organic alcohol as the extractant, and then distilled at reduced pressure to obtain lithium salt (CN106082285B); (3) simultaneously extracting lithium and boron, for example, Tan Xiumin et, al. employed a evaporation process to concentrate underground brine several times, then employed an ion exchange method to extract boric acid, after then, sodium salt was precipitated by evaporation at high temperature, potassium salt was precipitated by cooling and crystallization at low temperature, and lithium carbonate was prepared by precipitation of the mother liquor of potassium separation (CN103523801B), Yu Xiaoping et, al. utilized a mixed extraction system to simultaneously extract boron and lithium from brine, then utilized an acidic solution and an basic solution respectively to strip lithium and boron in the organic phase (CN108342595A), wherein the former process employed different technical means, boron and lithium can only be extracted in steps, which is not suitable for brines with higher contents of calcium and/or magnesium; while the later process involved multiple steps and long process flow, in which the stability of the extractant was still affected by the acid and base.

In terms of shortening process flow and improving comprehensive utilization of resources, extracting boron or lithium alone is not as efficient as extracting both lithium and boron. However, lithium and boron are very different in their properties, and extracting lithium and boron at the same time requires the relevant technical elements to be closely aligned. This is one of the long-standing problems to be solved urgently in the salt lake chemical region. Alkyl alcohols are a kind of stable neutral solvents, having specific ability to coordinate and extract boric acid molecules. They are divided into monohydric alcohols and polyhydric alcohols. If they can be combined with the new lithium extractant, it is possible to form an extraction system beyond expectation and a new method involving more excellent technological processes and more friendly technological levels. It is possible to realize truly a simultaneous coextraction of lithium and boron by solvent extraction, which separates from large amounts of magnesium salts in the mother liquor, and convert the salt lake brine with a high magnesium-lithium ratio into a brine with a low magnesium-lithium ratio, thus preparing chemical products required in the market lithium chloride, lithium carbonate, lithium hydroxide and so on, at the same time which can also purify a brine, enrich boron element and prepare a boric acid product.

SUMMARY

To address the defects existing in the prior art, the disclosure aims to provide an economical and effective extraction system and extraction method for separating magnesium and extracting lithium and boron from magnesium-containing brine with a complex solvent of secondary amide/alkyl alcohol, as well as applications thereof.

The disclosure provides technical schemes and processes as below:

1. An extraction system for separating magnesium and extracting lithium and boron from magnesium-containing brine with a complex solvent of secondary amide/alkyl alcohol, the extraction system contains substances of classes A and B; wherein the substances of class A are secondary amides consisting of a single compound or a mixture of two or more compounds; wherein, the single compound has a structure as shown in Formula (I):

Wherein, $R_1$ is selected from a C2~C12 alkyl or a C3~C12 cycloalkyl containing a single-ring structure, $R_2$ is selected from a C1~C11 alkyl or a C3~C11 cycloalkyl containing a single-ring structure, and the sum of the number of carbon atoms contained in the two groups $R_1$ and $R_2$ is 11~17, wherein the alkyl or the cycloalkyl comprises various isomers (because $R_1$ and $R_2$ are variable, so when $R_1$ and $R_2$ are well-determined, the substances of class A are a single compound, while the mixture means a substance mixed by two or more compounds generated as a result of the variations of $R_1$ and $R_2$);

Wherein the substances of class B are alkyl alcohols consisting of a single compound or a mixture of two or more compounds; wherein, the single compound has a structure as shown in Formula (II):

$$R_3\text{—OH} \quad (II);$$

Wherein, $R_3$ is selected from a C8~C20 alkyl, wherein the alkyl comprises various linear or branched isomers (because $R_3$ is variable, so when $R_3$ is well-determined, the substances of class B are a single compound, while the mixture means a substance mixed by two or more compounds generated as a result of the variations of $R_3$);

The extraction system containing substances of classes A and B has a freezing point less than 0° C. (the freezing point of the single component constituting extraction system may be less than, equal to or greater than 0° C.; when the freezing point of the single component is less than 0° C., namely it can satisfy the condition of extraction system as the invention; when the freezing point of the single component is greater than or equal to 0° C., it is likely to mix with other components with a freezing point less than 0° C. to dissolve and eventually form a mixture with a freezing point less than 0° C.).

In the extraction system, the substances of class A are mainly used for extracting lithium, accounting for a volume percentage of 0~100% in the whole organic phase, not including two endpoint values (when the substances of class A account for a higher volume percentage, it is beneficial to extract lithium from the magnesium-containing brine); in the extraction system, the substances of class B are mainly used for extracting boron, accounting for a volume percentage of 0~100% in the whole organic phase, not including two endpoint values (when the substances of class B account for a higher volume percentage, it is beneficial to extract boron from the magnesium-containing brine).

In the extraction system, when the extraction system is in favour of extracting lithium and boron simultaneously, the substances of class A account for a volume percentage of 50~90% in the whole organic phase, and the substances of class B account for a volume percentage of 10~50% in the whole organic phase (when the substances of classes A and B both account for larger volume percentages, it is beneficial for extracting lithium and boron from the magnesium-containing brine simultaneously).

The extraction system further comprises a diluent 260# solvent oil, 300# solvent oil or sulfonated kerosene which act as diluents.

2. An extraction method for separating magnesium and extracting lithium and boron from magnesium-containing brine with a complex solvent of secondary amide/alkyl alcohol, comprising the following steps:

S1. The magnesium-containing brine is taken as a pre-extraction brine phase; wherein, in the magnesium-containing brine, the concentration of lithium ions is 0.1~21 g/L, the concentration of magnesium ions is 80~125 g/L, the concentration of chloride ions is 200~400 g/L, the mass ratio of magnesium to lithium is 4.8~1100:1, the concentration of boric acid and borate ions is 0.5~20 g/L totally on the basis of $B_2O_3$, the density of brine at 20° C. is 1.25~1.38 g/cm³, and the pH value of the brine is adjusted to 0~7 with hydrochloric acid or sulfuric acid;

S2. The extraction system of the above 1 is taken as a pre-extraction organic phase;

S3. The pre-extraction organic phase and the pre-extraction brine phase are mixed at a volume ratio of 1~10:1, and subjected to a single-stage extraction or a multi-stage countercurrent extraction, then subjected to a two-phase separation to get a loaded organic phase and a post-extraction brine phase.

The magnesium-containing brine also comprises one or two or more of sodium ions, potassium ions, ferric ions, ferrous ions or sulfate radicals.

The magnesium-containing brine comprises lithium and boron-containing salt lake brine, but not limited to such a kind of brine.

Further, in the step S3, the extraction temperature is 0~50° C.; the two phases are mixed with stirring; after the extraction, the two phases are separated by centrifugation or settlement.

Further, after the step S3, it further comprises the following steps:

S4. With water as a stripping agent, the loaded organic phase is subjected to a single-stage stripping or a multi-stage countercurrent stripping, the ratio of stripping phases, i.e., the volume ratio of the stripping agent to the loaded organic phase, is 1:1~20, then the two phases are separated to get a post-stripping organic phase and a post-stripping water phase;

S5. The post-stripping organic phase is returned to the step S2 to realize the recycling of the extraction system.

Further, in the step S4, the stripping temperature is 0~50° C.; the two phases are mixed with stirring, after the stripping, the two phases are separated by centrifugation or settlement.

3. An application of the extraction method for separating magnesium and extracting lithium and boron from magnesium-containing brine with a complex solvent of secondary amide/alkyl alcohol in obtaining a boron product boric acid, wherein, after the step S4, it further comprises the following step:

S6. The post-stripping water phase is further purified through oil removal, and concentrated; the pH value of the water phase is adjusted with hydrochloric acid or sulfuric acid; boric acid is precipitated from the solution, washed and dried to produce a boric acid product.

4. An application of the extraction method for separating magnesium and extracting lithium and boron from magnesium-containing brine with a complex solvent of secondary amide/alkyl alcohol in obtaining a lithium product lithium chloride, wherein, after the step S4, it further comprises the following steps:

S6. The post-stripping water phase is further purified through oil removal, and concentrated; the pH value of the water phase is adjusted with hydrochloric acid or sulfuric acid; boric acid is precipitated from the solution, washed and dried to produce a boric acid product;

S7. An agent for removing impurities is added into the lithium-containing solution after the precipitation of boric acid to remove the sulfate radicals and remaining magnesium ions therein, to get a refined lithium chloride solution; the agent for removing impurities is one or two or more of calcium oxide, calcium hydroxide, calcium chloride, barium chloride, sodium carbonate, sodium oxalate or sodium hydroxide;

S8. The refined lithium chloride solution is subjected to concentration, crystallization, separation and drying to produce a lithium chloride product.

5. An application of the extraction method for separating magnesium and extracting lithium and boron from magnesium-containing brine with a complex solvent of secondary amide/alkyl alcohol in obtaining a lithium product lithium carbonate, wherein, after the step S4, it further comprises the following steps:

S6. The post-stripping water phase is further purified through oil removal, and concentrated; the pH value of the water phase is adjusted with hydrochloric acid or sulfuric acid; boric acid is precipitated from the solution, washed and dried to produce a boric acid product;

S7. An agent for removing impurities is added into the lithium-containing solution after the precipitation of boric acid to remove the sulfate radicals and remaining magnesium ions therein, to get a refined lithium chloride solution; the agent for removing impurities is one or two or more of calcium oxide, calcium hydroxide, calcium chloride, barium chloride, sodium carbonate, sodium oxalate or sodium hydroxide;

S9. To the refined lithium chloride solution is added sodium carbonate to get a lithium carbonate precipitate, which is separated and dried to produce a lithium carbonate product.

6. An application of the extraction method for separating magnesium and extracting lithium and boron from magnesium-containing brine with a complex solvent of secondary amide/alkyl alcohol in obtaining a lithium product lithium hydroxide, wherein, after the step S4, it further comprises the following steps:

S6. The post-stripping water phase is further purified through oil removal, and concentrated; the pH value of the water phase is adjusted with hydrochloric acid or sulfuric acid; boric acid is precipitated from the solution, washed and dried to produce a boric acid product;

S7. An agent for removing impurities is added into the lithium-containing solution after the precipitation of boric acid to remove the sulfate radicals and remaining magnesium ions therein, to get a refined lithium chloride solution; the agent for removing impurities is one or two or more of calcium oxide, calcium hydroxide, calcium chloride, barium chloride, sodium carbonate, sodium oxalate or sodium hydroxide;

S10. The refined lithium chloride solution is subjected to electrolysis, to produce a lithium hydroxide product; meanwhile the byproducts hydrogen gas and chlorine gas can be used in the production of hydrochloric acid;

Or after the step S7, it further comprises the following steps:

S9. To the refined lithium chloride solution is added sodium carbonate to get a lithium carbonate precipitate, which is separated and dried to produce a lithium carbonate product;

S11. To the obtained lithium carbonate is added a calcium hydroxide emulsion for a solid-liquid reaction, then separated to get a lithium hydroxide solution, which is concentrated, crystallized and dried to produce a lithium hydroxide product.

The secondary amide type compounds used in the embodiments of the invention are derived from the stoichiometric reaction of organoacyl chlorides or anhydrides with primary amines, which are washed with water and purified by distillation at reduced pressure, then detected and accessed with U.S. Agilent 7890A/5975C type gas chromatography-mass spectrometer. The alkyl alcohol compounds used in the embodiments of the invention are commercially available from Chemicals Corp.

Compared with the prior art, we have found in the disclosure that by employing the complex solvent of secondary amide/alkyl alcohol consisting of the compounds as shown in Formula (I) and Formula (II) as a new extraction system, a new extraction method for separating magnesium and extracting lithium and boron from magnesium-containing brine and its application can be therefore obtained, achieving unexpected effects. There have been no documents reporting about using a solvent composed of secondary amides and alkyl alcohols mixing as an extraction system for extracting lithium from brines, thus providing a new technology for the current exploitation of lithium resources in salt lake brine with high magnesium-lithium ratio. The disclosure has the following beneficial effects:

1) The secondary amides, as the substances of class A in the extraction system, have simple molecular structures, they are easily available and easy to produce. They are used as the extractants of lithium, which are a kind of novel specific components for separating magnesium and extracting lithium from magnesium-containing brine. Wherein, the secondary amide functional groups are the key locations for lithium-magnesium separation and lithium extraction. The hydrogen atom in N—H shifts towards the low field in the pre- and post-extraction $^1$H NMR spectrum, playing a key role in the extraction of Li+ Alkyl alcohols, as the substances of class B in the extraction system, are used as the extractants of boron in the brine, which can efficiently improve the physical properties of the complex solvent, such as the viscosity, the freezing point and the like, increase the mixing entropy of the system, and generate a synergistic coextraction effect.

2) Under the premise of ensuring a certain single-stage extraction capacity of $Li^+$, the loaded organic phase can be easily stripped with water directly. There is no need to use acid to enhance the stripping of $Li^+$, meanwhile there is also no need to use base to neutralize the previous acid to restore the extraction capacity of the organic phase and the acidity-alkalinity of the water phase, thus greatly reducing the consumption of acid and base during the lithium-magnesium separation of brine, achieving the bidirectional equilibrium between extraction and stripping processes, and making it easy to perform the extraction of lithium and boron and the stripping of lithium and boron at the same time. Upon multi-stage countercurrent extraction, the magnesium-containing brine will have a large separation coefficient of lithium and magnesium, and after stripping, the mass ratio of magnesium to lithium in the water phase is significantly reduced.

3) The whole process of extraction and separation is greatly simplified, the organic phase can be recycled directly, there is low corrosion to the equipment, and the production process is easy to control. The organic phase has a low density, which is suitable for the two-phase separation when water is used to strip the loaded organic phase. Through adjusting the molecular structure and the composition of the extraction system, the preferred extraction system will have a significantly reduced solubility in water compared with that of TBP.

BRIEF DESCRIPTION OF DRAWINGS

FIG. 1 is the process flow diagram showing an extraction system and an extraction method for separating magnesium and extracting lithium and boron from magnesium-containing brine with a complex solvent of secondary amide/alkyl alcohol, and applications thereof according to the invention.

DETAILED DESCRIPTION OF EMBODIMENTS

The disclosure will be further illustrated below in combination with embodiments:

Embodiment 1

In brine from a salt lake in the Chaidamu basin of Qinghai province, the contents of $Li^+$, $Mg^{2+}$ and $B_2O_3$ were 2.00, 113.43 and 8.15 g/L respectively, the mass ratio of magnesium to lithium was 56.67:1, wherein the contents of Na$^+$, K$^+$, Cl$^-$ and SO$_4^{2-}$ were 3.83, 1.60, 325.98 and 44.00 g/L respectively, the density of brine was 1.34 g/cm$^3$, and the pH value of the brine was 4.3. 10 mL of this brine was added into a 100 mL ground conical flask, into which was then added 30 mL N-isooctyl valeramide and 20 mL 2-propyl heptanol as the extractants, wherein the alkyl alcohol accounted for 40% the volume of the organic phase, and the volume ratio of the organic phase to the salt lake brine was 5:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:4.6 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min, to get a post-stripping organic phase and a water phase.

Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing into analytical solutions, sampling and analyzing the contents of Li$^+$, Mg$^{2+}$ and B$_2$O$_3$, thus calculating the extraction rate E, the stripping rate S, the distribution ratio D and the separation coefficient of lithium and magnesium β, with the results being shown in Table 1.

was 74.38%, the single-stage stripping rate of Mg$^{2+}$ was 89.14%, the separation coefficient of lithium and magnesium after stripping was 0.35, and the mass ratio of magnesium to lithium in the water phase was reduced to 1.17. The single-stage extraction rate of B$_2$O$_3$ was 42.66%, The single-stage stripping rate of B$_2$O$_3$ was 82.46%.

Embodiment 2

15 mL N-octyl isobutyramide and 5 mL 2-heptyl undecanol were placed together into a 100 mL ground conical flask as the extractants, with the alkyl alcohol accounting for 25% the volume of the organic phase, into which was then added 5 mL salt lake brine of Embodiment 1, the pH value was adjusted to 2.0 with concentrated hydrochloric acid, wherein the volume ratio of the organic phase to the salt lake brine was 4:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 100 mL plastic test tube, and centrifuged in a LD5-10 benchtop centrifuge at a rotational speed of 4500 r/min for 10 min. When the interface was clear, the two phases were separated to get a post-extraction loaded organic phase and a remaining brine phase. The loaded organic phase was transferred into another 100 mL ground conical flask, into which was added deionized water at a volume ratio of 1:4 to the organic phase. The ground conical flask was placed in a DF-101S heat collecting type thermostat magnetic stirrer for stripping and two-phase mixing at 20° C. for 30 min. The mixed liquid was then transferred into a 100 mL plastic test tube, and centrifuged in a LD5-10 benchtop centrifuge at a rotational speed of 4500 r/min for 10 min, to get a post-stripping organic phase and a water phase.

Japan Shimadzu AA-7000 Atomic Absorption Spectrophotometer standard addition method, an EDTA titration method and a mannitol method were respectively used, keeping the brine phase and the water phase in the processes

TABLE 1

Two-phase separation profile of Li$^+$, Mg2$^+$ and B$_2$O$_3$ in the brine of a salt lake in Qinghai province by a complex solvent of N-isooctyl valeramide and 2-propyl heptanol*

|  | O/A$^a$ | E(Li$^+$)/%$^b$ | E(Mg$^{2+}$)%$^c$ | D(Li$^+$)$^d$ | D(Mg$^{2+}$)$^e$ | β(Li$^+$/Mg$^{2+}$)$^f$ | m$_o$(Mg$^{2+}$)/m$_o$(Li$^+$)$^g$ | m$_w$(Mg$^{2+}$)/m$_w$(Li$^+$)$^h$ | E(B$_2$O$_3$)/%$^i$ |
|---|---|---|---|---|---|---|---|---|---|
| Extraction | 5:1 | 40.47 | 0.69 | 0.14 | 0.0014 | 98.27 | 0.98 | 95.83 | 42.66 |

|  | A/O$^j$ | S(Li$^+$)/%$^k$ | S(Mg$^{2+}$)%$^l$ | D$_s$(Li$^+$)$^m$ | D$_s$(Mg$^{2+}$)$^n$ | β$_s$(Li$^+$/Mg$^{2+}$)$^o$ | m$_{so}$(Mg$^{2+}$)/m$_{so}$(Li$^+$)$^p$ | m$_{sw}$(Mg$^{2+}$)/m$_{sw}$(Li$^+$)$^q$ | S(B$_2$O$_3$)/%$^r$ |
|---|---|---|---|---|---|---|---|---|---|
| Stripping | 1:4.6 | 74.38 | 89.14 | 13.44 | 38.00 | 0.35 | 0.41 | 1.17 | 82.46 |

*Wherein, the symbolic meanings are respectively specified as below:
$^a$volume ratio of the organic phase to the water phase, $^b$extraction rate of Li$^+$, $^c$extraction rate of Mg$^{2+}$, $^d$distribution ratio of L$^+$, $^e$distribution ratio of Mg$^{2+}$, $^f$separation coefficient of lithium and magnesium, $^g$mass ratio of magnesium to lithium in the post-extraction organic phase, $^h$mass ratio of magnesium to lithium in the post-extraction brine, $^i$extraction rate of B$_2$O$_3$; $^j$volume ratio of the water phase to the organic phase, $^k$stripping ratio of Li$^+$, $^l$stripping ratio of Mg$^{2+}$, $^m$stripping distribution ratio of Li$^+$, $^n$stripping distribution ratio of Mg$^{2+}$, $^o$stripping separation coefficient of lithium and magnesium, $^p$mass ratio of magnesium to lithium in the post-stripping organic phase, $^q$mass ratio of magnesium to lithium in the post-stripping water phase, $^r$stripping rate of B2O3; the symbolic meanings in tables 2 to 33 below are also the same as the above.

As can be seen from Table 1, the single-stage extraction rate of Li$^+$ was 40.47%, the single-stage extraction rate of Mg$^{2+}$ was 0.69%, the separation coefficient of lithium and magnesium is 98.27. The single-stage stripping rate of Li$^+$ of extraction and stripping in constant volume, preparing into analytical solutions, sampling and analyzing the contents of Li$^+$, Mg$^{2+}$ and B$_2$O$_3$, thus calculating the experimental results as shown in Table 2.

TABLE 2

Two-phase separation profile of $Li^+$, $Mg^{2+}$ and $B_2O_3$ in the brine of a salt lake in Qinghai province by a complex solvent of N-octyl isobutyramide and 2-heptyl undecanol

|  | O/A | $E(Li^+)$/% | $E(Mg^{2+})$% | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ | $E(B_2O_3)$/% |
|---|---|---|---|---|---|---|---|---|---|
| Extraction | 4:1 | 52.43 | 3.83 | 0.28 | 0.010 | 27.68 | 4.14 | 114.57 | 29.95 |
|  | A/O | $S(Li^+)$/% | $S(Mg^{2+})$% | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ | $S(B_2O_3)$/% |
| Stripping | 1:4 | 83.38 | 38.25 | 21.13 | 2.61 | 8.10 | 15.38 | 1.90 | 93.80 |

As can be seen from Table 2, the single-stage extraction rate of $Li^+$ was 52.43%, the single-stage extraction rate of $Mg^{2+}$ was 3.83%, the separation coefficient of lithium and magnesium was 27.68. The single-stage stripping rate of $Li^+$ was 83.38%, the single-stage stripping rate of $Mg^{2+}$ was 38.25%, the separation coefficient of lithium and magnesium after stripping was 8.10, and the mass ratio of magnesium to lithium in the water phase was reduced to 1.90. The single-stage extraction rate of $B_2O_3$ was 29.95%, and the single-stage stripping rate of $B_2O_3$ was 93.80%.

Embodiment 3

30 mL N-isooctyl valeramide and 20 mL 2-propyl heptanol were added into a 100 mL ground conical flask as the extractants, with the alkyl alcohol accounting for 40% the volume of the organic phase, into which was then added 10 mL salt lake brine of Embodiment 1, the pH value was adjusted to 2.0 with concentrated hydrochloric acid, wherein the volume ratio of the organic phase to the salt lake brine was 5:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:4.7 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min, to get a post-stripping organic phase and a water phase.

Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing into analytical solutions, sampling and analyzing the contents of $Li^+$, $Mg^{2+}$ and $B_2O_3$, thus calculating the experimental results as shown in Table 3.

TABLE 3

Two-phase separation profile of $Li^+$, $Mg^{2+}$ and $B_2O_3$ in the brine of a salt lake in Qinghai province by a complex solvent of N-isooctyl valeramide and 2-propyl heptanol

|  | O/A | $E(Li^+)$/% | $E(Mg^{2+})$% | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ | $E(B_2O_3)$/% |
|---|---|---|---|---|---|---|---|---|---|
| Extraction | 5:1 | 41.76 | 1.74 | 0.14 | 0.0035 | 40.61 | 2.39 | 96.92 | 80.84 |
|  | A/O | $S(Li^+)$/% | $S(Mg^{2+})$% | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ | $S(B_2O_3)$/% |
| Stripping | 1:4.7 | 66.26 | 27.80 | 9.13 | 1.79 | 5.10 | 5.11 | 1.00 | 69.76 |

As can be seen from Table 3, the single-stage extraction rate of $Li^+$ was 41.76%, the single-stage extraction rate of $Mg^{2+}$ was 1.74%, the separation coefficient of lithium and magnesium was 40.61. The single-stage stripping rate of $Li^{2+}$ was 66.26%, the single-stage stripping rate of $Mg^{2+}$ was 27.80%, the separation coefficient of lithium and magnesium after stripping was 5.10, and the mass ratio of magnesium to lithium in the water phase was reduced to 1.00. The single-stage extraction rate of $B_2O_3$ was 80.84%, and the single-stage stripping rate of $B_2O_3$ was 69.76%.

Embodiment 4

30 mL N-isooctyl valeramide and 10 mL 2-propyl heptanol were added into a 100 mL ground conical flask as the extractants, with the alkyl alcohol accounting for 25% the volume of the organic phase, into which was then added 10 mL salt lake brine of Embodiment 1, the pH value was adjusted to 2.0 with concentrated hydrochloric acid, wherein the volume ratio of the organic phase to the salt lake brine was 4:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:3.6 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min, to get a post-stripping organic phase and a water phase.

Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing into analytical solutions, sampling and analyzing the contents of $Li^+$, $Mg^{2+}$ and $B_2O_3$, thus calculating the experimental results as shown in Table 4.

TABLE 4

Two-phase separation profile of $Li^+$, $Mg^{2+}$ and $B_2O_3$ in the brine of a salt lake in Qinghai province by a complex solvent of N-isooctyl valeramide and 2-propyl heptanol

| | O/A | E($Li^+$)/% | E($Mg^{2+}$)% | D($Li^+$) | D($Mg^{2+}$) | β($Li^+$/$Mg^{2+}$) | $m_o$($Mg^{2+}$)/$m_o$($Li^+$) | $m_w$($Mg^{2+}$)/$m_w$($Li^+$) | E($B_2O_3$)/% |
|---|---|---|---|---|---|---|---|---|---|
| Extraction | 4:1 | 49.21 | 1.45 | 0.24 | 0.0037 | 66.09 | 1.69 | 111.47 | 67.11 |

| | A/O | S($Li^+$)/% | S($Mg^{2+}$)% | $D_s$($Li^+$) | $D_s$($Mg^{2+}$) | $β_s$($Li^+$/$Mg^{2+}$) | $m_{so}$($Mg^{2+}$)/$m_{so}$($Li^+$) | $m_{sw}$($Mg^{2+}$)/$m_{sw}$($Li^+$) | S($B_2O_3$)/% |
|---|---|---|---|---|---|---|---|---|---|
| Stripping | 1:3.6 | 82.67 | 35.27 | 17.10 | 1.95 | 8.77 | 6.31 | 0.72 | 80.13 |

As can be seen from Table 4, the single-stage extraction rate of $Li^+$ was 49.21%, the single-stage extraction rate of $Mg^{2+}$ was 1.45%, the separation coefficient of lithium and magnesium was 66.09. The single-stage stripping rate of $Li^+$ was 82.67%, the single-stage stripping rate of $Mg^{2+}$ was 35.27%, the separation coefficient of lithium and magnesium after stripping was 8.77, and the mass ratio of magnesium to lithium in the water phase was reduced to 0.72. The single-stage extraction rate of $B_2O_3$ was 67.11%, and the single-stage stripping rate of $B_2O_3$ was 80.13%.

Embodiment 5

30 mL N-isooctyl isovaleramide and 10 mL 2-octyl dodecanol were added into a 100 mL ground conical flask as the extractants, with the alkyl alcohol accounting for 25% the volume of the organic phase, into which was then added 10 mL salt lake brine of Embodiment 1, the pH value was adjusted to 2.0 with concentrated hydrochloric acid, wherein the volume ratio of the organic phase to the salt lake brine was 4:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added water at a volume ratio of 1:7.5 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min, to get a post-stripping organic phase and a water phase.

Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing into analytical solutions, sampling and analyzing the contents of $Li^+$, $Mg^{2+}$ and $B_2O_3$, thus calculating the experimental results as shown in Table 5.

TABLE 5

Two-phase separation profile of Li$^+$, Mg$^{2+}$ and B$_2$O$_3$ in the brine of a salt lake in Qinghai province by a complex solvent of N-isooctyl isovaleramide and 2-octyl dodecanol

| | O/A | E(Li$^+$)/% | E(Mg$^{2+}$)% | D(Li$^+$) | D(Mg$^{2+}$) | β(Li$^+$/Mg$^{2+}$) | m$_o$(Mg$^{2+}$)/m$_o$(Li$^+$) | m$_w$(Mg$^{2+}$)/m$_w$(Li$^+$) | E(B$_2$O$_3$)/% |
|---|---|---|---|---|---|---|---|---|---|
| Extraction | 4:1 | 39.08 | 2.86 | 0.16 | 0.0075 | 21.31 | 4.20 | 91.60 | 42.62 |

| | A/O | S(Li$^+$)/% | S(Mg$^{2+}$)% | D$_s$(Li$^+$) | D$_s$(Mg$^{2+}$) | β$_s$(Li$^+$/Mg$^{2+}$) | m$_{so}$(Mg$^{2+}$)/m$_{so}$(Li$^+$) | m$_{sw}$(Mg$^{2+}$)/m$_{sw}$(Li$^+$) | S(B$_2$O$_3$)/% |
|---|---|---|---|---|---|---|---|---|---|
| Stripping | 1:7.5 | 87.87 | 38.40 | 54.62 | 4.70 | 11.62 | 21.33 | 1.84 | 88.74 |

As can be seen from Table 5, the single-stage extraction rate of Li$^+$ was 39.08%, the single-stage extraction rate of Mg$^{2+}$ was 2.86%, the separation coefficient of lithium and magnesium was 21.31. The single-stage stripping rate of Li$^+$ was 87.87%, the single-stage stripping rate of Mg$^{2+}$ was 38.40%, the separation coefficient of lithium and magnesium after stripping was 11.62, and the mass ratio of magnesium to lithium in the water phase was reduced to 1.84. The single-stage extraction rate of B$_2$O$_3$ was 42.62%, and the single-stage stripping rate of B$_2$O$_3$ was 88.74%.

Embodiment 6

16 mL N-pentyl isopelargonamide and 4 mL 3-octanol were added into a 100 mL ground conical flask as the extractants, with the alkyl alcohol accounting for 20% the volume of the organic phase, into which was then added 10 mL salt lake brine of Embodiment 1, the pH value was adjusted to 2.0 with concentrated hydrochloric acid, wherein the volume ratio of the organic phase to the salt lake brine was 2:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added water at a volume ratio of 1:4 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min to get a post-stripping organic phase and a water phase.

Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing into analytical solutions, sampling and analyzing the contents of Li$^+$, Mg$^{2+}$ and B$_2$O$_3$, thus calculating the experimental results as shown in Table 6.

TABLE 6

Two-phase separation profile of Li$^+$, Mg$^{2+}$ and B$_2$O$_3$ in the brine of a salt lake in Qinghai province by a complex solvent of N-pentyl isopelargonamide and 3-octanol

| | O/A | E(Li$^+$)/% | E(Mg$^{2+}$)/% | D(Li$^+$) | D(Mg$^{2+}$) | β(Li$^+$/Mg$^{2+}$) | m$_o$(Mg$^{2+}$)/m$_o$(Li$^+$) | m$_w$(Mg$^{2+}$)/m$_w$(Li$^+$) | E(B$_2$O$_3$)/% |
|---|---|---|---|---|---|---|---|---|---|
| Extraction | 2:1 | 20.13 | 0.87 | 0.13 | 0.0044 | 28.77 | 2.45 | 70.38 | 29.74 |

| | A/O | S(Li$^+$)/% | S(Mg$^{2+}$)/% | D$_s$(Li$^+$) | D$_s$(Mg$^{2+}$) | β$_s$(Li$^+$/Mg$^{2+}$) | m$_{so}$(Mg$^{2+}$)/m$_{so}$(Li$^+$) | m$_{sw}$(Mg$^{2+}$)/m$_{sw}$(Li$^+$) | S(B$_2$O$_3$)/% |
|---|---|---|---|---|---|---|---|---|---|
| Stripping | 1:4 | 96.19 | 24.08 | 102.94 | 1.29 | 79.80 | 48.82 | 0.61 | 92.11 |

As can be seen from Table 6, the single-stage extraction rate of Li$^+$ was 20.13%, the single-stage extraction rate of Mg$^{2+}$ was 0.87%, the separation coefficient of lithium and magnesium was 28.77. The single-stage stripping rate of Li$^+$ is 96.19%, the single-stage stripping rate of Mg$^{2+}$ was 24.08%, the separation coefficient of lithium and magnesium after stripping was 79.80, and the mass ratio of magnesium to lithium in the water phase was reduced to 0.61. The single-stage extraction rate of B$_2$O$_3$ was 29.74%, and the single-stage stripping rate of B$_2$O$_3$ was 92.11%.

Embodiment 7

In brine from a salt lake in the Chaidamu basin of Qinghai province, the contents of Li$^+$, Mg$^{2+}$ and B$_2$O$_3$ were 5.20, 116.28 and 17.62 g/L respectively, the mass ratio of magnesium to lithium was 22.36:1, wherein the contents of Na$^+$, K$^+$, Cl$^-$ and SO$_4^-$ were 2.70, 1.04, 346.21 and 37.32 g/L respectively, the density of brine was 1.36 g/cm$^3$, and the pH value of the brine was 4.1. 10 mL of this brine was added into a 100 mL ground conical flask, the pH value of the brine was about 2 after acidification with concentrated hydrochloric acid. Into the ground conical flask was then added 30 mL N-pentyl isopelargonamide and 10 mL 2-butyl octanol as the extractants, with the alkyl alcohol accounting for 25% the volume of the organic phase, wherein the volume ratio of the organic phase to the salt lake brine was 4:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:7.6 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min to get a post-stripping organic phase and a water phase.

Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing into analytical solutions, sampling and analyzing the contents of $Li^+$, $Mg^{2+}$ and $B_2O_3$, thus calculating the experimental results as shown in Table 7.

stage extraction rate of $B_2O_3$ was 44.52%, and the single-stage stripping rate of $B_2O_3$ was 78.05%.

Embodiment 8

24 mL N-pentyl isopelargonamide and 6 mL 2-hexyl decanol were added into a 100 mL ground conical flask as the extractants, with the alkyl alcohol accounting for 20% the volume of the organic phase, into which was then added 3 mL salt lake brine of Embodiment 1, wherein the volume ratio of the organic phase to the salt lake brine was 10:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:10 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min to get a post-stripping organic phase and a water phase.

TABLE 7

Two-phase separation profile of $Li^+$, $Mg^{2+}$ and $B_2O_3$ in the brine of a salt lake in Qinghai province by a complex solvent of N-pentyl isopelargonamide and 2-butyl octanol

| | O/A | $E(Li^+)$/% | $E(Mg^{2+})$/% | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ | $E(B_2O_3)$/% |
|---|---|---|---|---|---|---|---|---|---|
| Extraction | 4:1 | 35.69 | 1.55 | 0.14 | 0.0039 | 35.35 | 0.97 | 34.23 | 44.52 |

| | A/O | $S(Li^+)$/% | $S(Mg^{2+})$/% | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ | $S(B_2O_3)$/% |
|---|---|---|---|---|---|---|---|---|---|
| Stripping | 1:7.6 | 61.43 | 21.40 | 12.10 | 2.07 | 5.85 | 1.98 | 0.34 | 78.05 |

As can be seen from Table 7, the single-stage extraction rate of $Li^+$ was 35.69%, the single-stage extraction rate of $Mg^{2+}$ was 1.55%, the separation coefficient of lithium and magnesium was 35.35. The single-stage stripping rate of $Li^+$ was 61.43%, the single-stage stripping rate of $Mg^{2+}$ was 21.40%, the separation coefficient of lithium and magnesium after stripping was 5.85, and the mass ratio of magnesium to lithium in the water phase was reduced to 0.34. The single- Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing into analytical solutions, sampling and analyzing the contents of $Li^+$, $Mg^{2+}$ and $B_2O_3$, thus calculating the experimental results as shown in Table 8.

TABLE 8

Two-phase separation profile of $Li^+$, $Mg^{2+}$ and $B_2O_3$ in the brine of a salt lake in Qinghai province by a complex solvent of N-pentyl isopelargonamide and 2-hexyl decanol

|  | O/A | $E(Li^+)$/% | $E(Mg^{2+})$/% | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ | $E(B_2O_3)$/% |
|---|---|---|---|---|---|---|---|---|---|
| Extraction | 10:1 | 66.05 | 1.54 | 0.19 | 0.0016 | 124.28 | 1.32 | 164.44 | 47.32 |
|  | A/O | $S(Li^+)$/% | $S(Mg^{2+})$/% | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ | $S(B_2O_3)$/% |
| Stripping | 1:10 | 88.81 | 61.31 | 79.33 | 15.85 | 5.01 | 4.57 | 0.91 | 90.46 |

As can be seen from Table 8, the single-stage extraction rate of $Li^+$ was 66.05%, the single-stage extraction rate of $Mg^{2+}$ was 1.54%, the separation coefficient of lithium and magnesium was 124.28. The single-stage stripping rate of $Li^+$ was 88.81%, the single-stage stripping rate of $Mg^{2+}$ was 61.31%, the separation coefficient of lithium and magnesium after stripping was 5.01, and the mass ratio of magnesium to lithium in the water phase was reduced to 0.91. The single-stage extraction rate of $B_2O_3$ was 47.32%, and the single-stage stripping rate of $B_2O_3$ was 90.46%.

Embodiment 9

20 mL N-isooctyl heptamide and 5 mL 2-hexyl decanol were added into a 100 mL ground conical flask as extractantd, with the alkyl alcohol accounting for 20% the volume of the organic phase, into which was then added 5 mL salt lake brine of Embodiment 1, the pH value was adjusted to 2.0 with concentrated hydrochloric acid, wherein the volume ratio of the organic phase to the salt lake brine was 5:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:10 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min to get a post-stripping organic phase and a water phase.

Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing into analytical solutions, sampling and analyzing the contents of $Li^+$, $Mg^{2+}$ and $B_2O_3$, thus calculating the experimental results as shown in Table 9.

TABLE 9

Two-phase separation profile of $Li^+$, $Mg^{2+}$ and $B_2O_3$ in the brine of a salt lake in Qinghai province by a complex solvent of N-isooctyl heptamide and 2-hexyl decanol

|  | O/A | $E(Li^+)$/% | $E(Mg^{2+})$/% | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ | $E(B_2O_3)$/% |
|---|---|---|---|---|---|---|---|---|---|
| Extraction | 5:1 | 43.52 | 1.88 | 0.15 | 0.0038 | 40.26 | 2.45 | 98.50 | 46.82 |
|  | A/O | $S(Li^+)$/% | $S(Mg^{2+})$/% | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ | $S(B_2O_3)$/% |
| Stripping | 1:10 | 91.17 | 42.20 | 103.77 | 7.36 | 14.10 | 15.96 | 1.13 | 90.55 |

As can be seen from Table 9, the single-stage extraction rate of $Li^+$ was 43.52%, the single-stage extraction rate of $Mg^{2+}$ was 1.88%, the separation coefficient of lithium and magnesium was 40.26. The single-stage stripping rate of $Li^+$ is 91.17%, the single-stage stripping rate of $Mg^{2+}$ was 42.20%, the separation coefficient of lithium and magnesium after stripping was 14.10, and the mass ratio of magnesium to lithium in the water phase was reduced to 1.13. The single-stage extraction rate of $B_2O_3$ was 46.82%, and the single-stage stripping rate of $B_2O_3$ was 90.55%.

Embodiment 10

20 mL N-isooctyl caprylamide and 5 mL 2, 6-dimethyl-2-octanol were added into a 100 mL ground conical flask as the extractants, with the alkyl alcohol accounting for 20% the volume of the organic phase, into which was then added 5 mL salt lake brine of Embodiment 1, the pH value was adjusted to 2.0 with concentrated hydrochloric acid, wherein the volume ratio of the organic phase to the salt lake brine was 5:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 30° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:10 to the organic phase. The ground conical flask was placed in a DF-101S heat collecting type thermostat magnetic stirrer for stripping and two-phase mixing at 30° C. for 30 min. The mixed liquid was then transferred into a 250 mL plastic test tube, and centrifuged in a LD5-10 benchtop centrifuge at a rotational speed of 4500 r/min for 15 min to get a post-stripping organic phase and a water phase.

Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing into analytical solutions, sampling and analyzing the contents of $Li^+$, $Mg^{2+}$ and $B_2O_3$, thus calculating the experimental results as shown in Table 10.

As can be seen from Table 10, the single-stage extraction rate of $Li^+$ was 45.64%, the single-stage extraction rate of $Mg^{2+}$ was 1.34%, the separation coefficient of lithium and magnesium was 61.96. The single-stage stripping rate of $Li^+$ was 84.15%, the single-stage stripping rate of $Mg^{2+}$ was 20.43%, the separation coefficient of lithium and magnesium after stripping was 20.68, and the mass ratio of magnesium to lithium in the water phase was reduced to 0.40. The single-stage extraction rate of $B_2O_3$ was 43.25%, and the single-stage stripping rate of $B_2O_3$ was 86.07%.

Embodiment 11

10 mL N-isobutyl isopelargonamide (liquid after heating), 10 mL N-isooctyl isovaleramide and 5 mL 2-propyl heptanol were added into a 100 mL ground conical flask as the extractants, with the alkyl alcohol accounting for 20% the volume of the organic phase, into which was then added 5 mL salt lake brine of Embodiment 1, the pH value was adjusted to 2.0 with concentrated hydrochloric acid, wherein the volume ratio of the organic phase to the salt lake brine was 5:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:10 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min to get a post-stripping organic phase and a water phase.

Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing into analytical solutions, sampling and analyzing the contents of $Li^+$, $Mg^{2+}$ and $B_2O_3$, thus calculating the experimental results as shown in Table 11.

TABLE 10

Two-phase separation profile of $Li^+$, $Mg^{2+}$ and $B_2O_3$ in the brine of a salt lake in Qinghai province by a complex solvent of N-isooctyl caprylamide and 2,6-dimethyl-2-octanol

|  | O/A | $E(Li^+)$/% | $E(Mg^{2+})$/% | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ | $E(B_2O_3)$/% |
|---|---|---|---|---|---|---|---|---|---|
| Extraction | 5:1 | 45.64 | 1.34 | 0.17 | 0.0027 | 61.96 | 1.66 | 102.90 | 43.25 |

|  | A/O | $S(Li^+)$/% | $S(Mg^{2+})$/% | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ | $S(B_2O_3)$/% |
|---|---|---|---|---|---|---|---|---|---|
| Stripping | 1:10 | 84.15 | 20.43 | 53.57 | 2.59 | 20.68 | 8.34 | 0.40 | 86.07 |

TABLE 11

Two-phase separation profile of $Li^+$, $Mg^{2+}$ and $B_2O_3$ in the brine of a salt lake in Qinghai province by a complex solvent of N-isobutyl isopelargonamide, N-isooctyl isovaleramide and 2-propyl heptanol

| | O/A | $E(Li^+)/$ % | $E(Mg^{2+})/$ % | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ | $E(B_2O_3)/$ % |
|---|---|---|---|---|---|---|---|---|---|
| Extraction | 5:1 | 51.52 | 1.14 | 0.21 | 0.0023 | 92.23 | 1.25 | 115.61 | 53.06 |

| | A/O | $S(Li^+)/$ % | $S(Mg^{2+})/$ % | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ | $S(B_2O_3)/$ % |
|---|---|---|---|---|---|---|---|---|---|
| Stripping | 1:10 | 90.60 | 47.43 | 95.31 | 8.90 | 10.71 | 7.03 | 0.66 | 77.36 |

As can be seen from Table 11, the single-stage extraction rate of $Li^+$ was 51.52%, the single-stage extraction rate of $Mg^{2+}$ was 1.14%, the separation coefficient of lithium and magnesium is 92.23. The single-stage stripping rate of $Li^+$ is 90.60%, the single-stage stripping rate of $Mg^{2+}$ was 47.43%, the separation coefficient of lithium and magnesium after stripping was 10.71, and the mass ratio of magnesium to lithium in the water phase was reduced to 0.66. The single-stage extraction rate of $B_2O_3$ was 53.06%, and the single-stage stripping rate of $B_2O_3$ was 77.36%.

Embodiment 12

15 mL N-isopentyl caprylamide, 15 mL N-isooctyl valeramide and 10 mL 2-propyl heptanol were added into a 100 mL ground conical flask as the extractants, with the alkyl alcohol accounting for 25% the volume of the organic phase, into which was then added 10 mL salt lake brine of Embodiment 1, the pH value was adjusted to 2.0 with concentrated hydrochloric acid, wherein the volume ratio of the organic phase to the salt lake brine was 4:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:7.5 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min to get a post-stripping organic phase and a water phase.

Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing into analytical solutions, sampling and analyzing the contents of $Li^+$, $Mg^{2+}$ and $B_2O_3$, thus calculating the experimental results as shown in Table 12.

TABLE 12

Two-phase separation profile of $Li^+$, $Mg^{2+}$ and $B_2O_3$ in the brine of a salt lake in Qinghai province by a complex solvent of N-isopentyl caprylamide, N-isooctyl valeramide and 2-propyl heptanol

| | O/A | $E(Li^+)/$ % | $E(Mg^{2+})/$ % | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ | $E(B_2O_3)/$ % |
|---|---|---|---|---|---|---|---|---|---|
| Extraction | 4:1 | 59.52 | 2.39 | 0.37 | 0.0061 | 59.99 | 2.31 | 138.49 | 56.89 |

| | A/O | $S(Li^+)/$ % | $S(Mg^{2+})/$ % | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ | $S(B_2O_3)/$ % |
|---|---|---|---|---|---|---|---|---|---|
| Stripping | 1:7.5 | 81.36 | 24.43 | 32.93 | 2.44 | 13.50 | 9.36 | 0.69 | 67.47 |

As can be seen from Table 12, the single-stage extraction rate of $Li^+$ was 59.52%, the single-stage extraction rate of $Mg^{2+}$ was 2.39%, the separation coefficient of lithium and magnesium was 59.99. The single-stage stripping rate of $Li^+$ was 81.36%, the single-stage stripping rate of $Mg^{2+}$ was 24.43%, the separation coefficient of lithium and magnesium after stripping was 13.50, and the mass ratio of magnesium to lithium in the water phase was reduced to 0.69. The single-stage extraction rate of $B_2O_3$ was 56.89%, and the single-stage stripping rate of $B_2O_3$ was 67.47%.

Embodiment 13

10 mL N-pentyl isopelargonamide, 10 mL N-isooctyl valeramide and 5 mL diisobutyl methanol were added into a 100 mL ground conical flask as the extractants, with the alkyl alcohol accounting for 20% the volume of the organic phase, into which was then added 5 mL salt lake brine of Embodiment 1, the pH value was adjusted to 2.0 with concentrated hydrochloric acid, wherein the volume ratio of the organic phase to the salt lake brine was 5:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:10 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min to get a post-stripping organic phase and a water phase.

Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing into analytical solutions, sampling and analyzing the contents of $Li^+$, $Mg^{2+}$ and $B_2O_3$, thus calculating the experimental results as shown in Table 13.

As can be seen from Table 13, the single-stage extraction rate of $Li^+$ was 50.79%, the single-stage extraction rate of $Mg^{2+}$ was 1.57%, the separation coefficient of lithium and magnesium was 64.50. The single-stage stripping rate of $Li^+$ was 76.48%, the single-stage stripping rate of $Mg^{2+}$ was 30.69%, the separation coefficient of lithium and magnesium after stripping was 7.34, and the mass ratio of magnesium to lithium in the water phase was reduced to 0.71. The single-stage extraction rate of $B_2O_3$ was 48.31%, and the single-stage stripping rate of $B_2O_3$ was 74.74%.

Embodiment 14

15 mL N-isopentyl caprylamide, 15 mL N-isooctyl valeramide and 10 mL 2-propyl heptanol were added into a 100 mL ground conical flask as the extractants, with the alkyl alcohol accounting for 25% the volume of the organic phase, into which was then added 10 mL salt lake brine of Embodiment 7, the pH value was adjusted to 2.0 with concentrated hydrochloric acid, wherein the volume ratio of the organic phase to the salt lake brine was 4:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:7.4 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 15 min to get a post-stripping organic phase and a water phase.

Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing into analytical solutions, sampling and analyzing the contents of $Li^+$, $Mg^{2+}$ and $B_2O_3$, thus calculating the experimental results as shown in Table 14.

TABLE 13

Two-phase separation profile of $Li^+$, $Mg^{2+}$ and $B_2O_3$ in the brine of a salt lake in Qinghai province by a complex solvent of N-pentyl isopelargonamide, N-isooctyl valeramide and diisobutyl methanol

|  | O/A | $E(Li^+)$/% | $E(Mg^{2+})$/% | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ | $E(B_2O_3)$/% |
|---|---|---|---|---|---|---|---|---|---|
| Extraction | 5:1 | 50.79 | 1.57 | 0.21 | 0.0032 | 64.50 | 1.76 | 113.40 | 48.31 |

|  | A/O | $S(Li^+)$/% | $S(Mg^{2+})$/% | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ | $S(B_2O_3)$/% |
|---|---|---|---|---|---|---|---|---|---|
| Stripping | 1:10 | 76.48 | 30.69 | 32.52 | 4.43 | 7.34 | 5.18 | 0.71 | 74.74 |

TABLE 14

Two-phase separation profile of Li$^+$, Mg$^{2+}$ and B$_2$O$_3$ in the brine of a salt lake in Qinghai province by a complex solvent of N-isopentyl caprylamide, N-isooctyl valeramide and 2-propyl heptanol

|  | O/A | E(Li$^+$)/% | E(Mg$^{2+}$)/% | D(Li$^+$) | D(Mg$^{2+}$) | β(Li$^+$/Mg$^{2+}$) | m$_o$(Mg$^{2+}$)/m$_o$(Li$^+$) | m$_w$(Mg$^{2+}$)/m$_w$(Li$^+$) | E(B$_2$O$_3$)/% |
|---|---|---|---|---|---|---|---|---|---|
| Extraction | 4:1 | 48.06 | 2.19 | 0.23 | 0.0056 | 41.24 | 1.02 | 42.11 | 48.46 |
|  | A/O | S(Li$^+$)/% | S(Mg$^{2+}$)/% | D$_s$(Li$^+$) | D$_s$(Mg$^{2+}$) | β$_s$(Li$^+$/Mg$^{2+}$) | m$_{so}$(Mg$^{2+}$)/m$_{so}$(Li$^+$) | m$_{sw}$(Mg$^{2+}$)/m$_{sw}$(Li$^+$) | S(B$_2$O$_3$)/% |
| Stripping | 1:7.4 | 84.01 | 33.78 | 38.87 | 3.77 | 10.31 | 4.22 | 0.41 | 67.51 |

As can be seen from Table 14, the single-stage extraction rate of Li$^+$ was 48.06%, the single-stage extraction rate of Mg$^{2+}$ was 2.19%, the separation coefficient of lithium and magnesium was 41.24. The single-stage stripping rate of Li$^+$ was 84.01%, the single-stage stripping rate of Mg$^{2+}$ was 33.78%, the separation coefficient of lithium and magnesium after stripping was 10.31, and the mass ratio of magnesium to lithium in the water phase was reduced to 0.41. The single-stage extraction rate of B$_2$O$_3$ was 48.46%, and the single-stage stripping rate of B$_2$O$_3$ was 67.51%.

Embodiment 15

15 mL N-isopentyl caprylamide, 2.5 mL 2-propyl heptanol and 2.5 mL 2-butyl octanol as the extractants were placed together into a 100 mL ground conical flask, with the alkyl alcohol accounting for 25% the volume of the organic phase, into which was then added 5 mL salt lake brine of Embodiment 1, the pH value was adjusted to 2.0 with concentrated hydrochloric acid, wherein the volume ratio of the organic phase to the salt lake brine was 4:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 100 mL plastic test tube, and centrifuged in a LD5-10 benchtop centrifuge at a rotational speed of 4500 r/min for 10 min. When the interface was clear, the two phases were separated to get a post-extraction loaded organic phase and a remaining brine phase. The loaded organic phase was transferred into another 100 mL ground conical flask, into which was added deionized water at a volume ratio of 1:8 to the organic phase. The ground conical flask was placed in a DF-101S heat collecting type thermostat magnetic stirrer for stripping and two-phase mixing at 20° C. for 30 min. The mixed liquid was then transferred into a 100 mL plastic test tube, and centrifuged in a LD5-10 benchtop centrifuge at a rotational speed of 4500 r/min for 10 min to get a post-stripping organic phase and a water phase.

Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing into analytical solutions, sampling and analyzing the contents of Li$^+$, Mg$^{2+}$ and B$_2$O$_3$, thus calculating the experimental results as shown in Table 15.

TABLE 15

Two-phase separation profile of Li$^+$, Mg$^{2+}$ and B$_2$O$_3$ in the brine of a salt lake in Qinghai province by a complex solvent of N-isopentyl caprylamide, 2-propyl heptanol and 2-butyl octanol

|  | O/A | E(Li$^+$)/% | E(Mg$^{2+}$)/% | D(Li$^+$) | D(Mg$^{2+}$) | β(Li$^+$/Mg$^{2+}$) | m$_o$(Mg$^{2+}$)/m$_o$(Li$^+$) | m$_w$(Mg$^{2+}$)/m$_w$(Li$^+$) | E(B$_2$O$_3$)/% |
|---|---|---|---|---|---|---|---|---|---|
| Extraction | 4:1 | 60.95 | 3.34 | 0.39 | 0.0086 | 45.22 | 3.11 | 140.27 | 53.50 |
|  | A/O | S(Li$^+$)/% | S(Mg$^{2+}$)/% | D$_s$(Li$^+$) | D$_s$(Mg$^{2+}$) | β$_s$(Li$^+$/Mg$^{2+}$) | m$_{so}$(Mg$^{2+}$)/m$_{so}$(Li$^+$) | m$_{sw}$(Mg$^{2+}$)/m$_{sw}$(Li$^+$) | S(B$_2$O$_3$)/% |
| Stripping | 1:8 | 72.83 | 41.99 | 21.48 | 5.80 | 3.70 | 6.64 | 1.79 | 80.81 |

As can be seen from Table 15, the single-stage extraction rate of $Li^+$ was 60.95%, the single-stage extraction rate of $Mg^{2+}$ was 3.34%, the separation coefficient of lithium and magnesium was 45.22. The single-stage stripping rate of $Li^+$ was 72.83%, the single-stage stripping rate of $Mg^{2+}$ was 41.99%, the separation coefficient of lithium and magnesium after stripping was 3.70, and the mass ratio of magnesium to lithium in the water phase was reduced to 1.79. The single-stage extraction rate of $B_2O_3$ was 53.50%, and the single-stage stripping rate of $B_2O_3$ was 80.81%.

Embodiment 16

35 mL N-isooctyl valeramide and 10 mL 2-butyl octanol as the extractants, 5 mL 260# solvent oil as the diluent were placed together into a 100 mL ground conical flask, with the alkyl alcohol and the diluent accounting for 20% and 10% the volume of the organic phase respectively, into which was then added 10 mL salt lake brine of Embodiment 1, the pH value was adjusted to 2.0 with concentrated hydrochloric acid, wherein the volume ratio of the organic phase to the salt lake brine was 5:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 0° C. and extracted for 30 min. The mixed liquid was then transferred into a 250 mL plastic test tube, and centrifuged in a LD5-10 benchtop centrifuge at a rotational speed of 4800 r/min for 15 min. When the interface was clear, the two phases were separated to get a post-extraction loaded organic phase and a remaining brine phase. The loaded organic phase was transferred into another 100 mL ground conical flask, into which was added deionized water at a volume ratio of 1:9.5 to the organic phase. The ground conical flask was placed in a DF-101S heat collecting type thermostat magnetic stirrer for stripping and two-phase mixing at 0° C. for 30 min. The mixed liquid was then transferred into a 250 mL plastic test tube, and centrifuged in a LD5-10 benchtop centrifuge at a rotational speed of 4800 r/min for 15 min to get a post-stripping organic phase and a water phase.

Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing into analytical solutions, sampling and analyzing the contents of $Li^+$, $Mg^{2+}$ and $B_2O_3$, thus calculating the experimental results as shown in Table 16.

As can be seen from Table 16, the single-stage extraction rate of $Li^+$ was 54.63%, the single-stage extraction rate of $Mg^{2+}$ was 2.52%, the separation coefficient of lithium and magnesium was 46.50. The single-stage stripping rate of $Li^+$ was 75.72%, the single-stage stripping rate of $Mg^{2+}$ was 38.46%, the separation coefficient of lithium and magnesium after stripping was 4.93, and the mass ratio of magnesium to lithium in the water phase was reduced to 1.35. The single-stage extraction rate of $B_2O_3$ was 53.23%, and the single-stage stripping rate of $B_2O_3$ was 81.99%.

Embodiment 17

10 mL N-pentyl isopelargonamide, 10 mL N-cyclopentyl pelargonamide (liquid after heating) and 5 mL 2-propyl heptanol were placed together into a 100 mL ground conical flask as the extractants, with the alkyl alcohol accounting for 20% the volume of the organic phase, into which was then added 5 mL salt lake brine of Embodiment 1, the pH value was adjusted to 2.0 with concentrated hydrochloric acid, wherein the volume ratio of the organic phase to the salt lake brine was 5:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 20 min. The mixed liquid was then transferred into a 250 mL plastic test tube, and centrifuged in a LD5-10 benchtop centrifuge at a rotational speed of 4500 r/min for 10 min. When the interface was clear, the two phases were separated to get a post-extraction loaded organic phase and a remaining brine phase. The loaded organic phase was transferred into another 100 mL ground conical flask, into which was added deionized water at a volume ratio of 1:5 to the organic phase. The ground conical flask was placed in a DF-101S heat collecting type thermostat magnetic stirrer for stripping and two-phase mixing at 20° C. for 20 min. The mixed liquid was then transferred into a 250 mL plastic test tube, and centrifuged in a LD5-10 benchtop centrifuge at a rotational speed of 4500 r/min for 10 min to get a post-stripping organic phase and a water phase.

Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing into analytical solutions, sampling and analyzing the contents of $Li^+$, $Mg^{2+}$ and $B_2O_3$, thus calculating the experimental results as shown in Table 17.

TABLE 16

Two-phase separation profile of $Li^+$, $Mg^{2+}$ and $B_2O_3$ in the brine of a salt lake in Qinghai province with a complex system of N-isooctyl valeramide, 2-butyl octanol and 260# solvent oil

| | O/A | $E(Li^+)$/% | $E(Mg^{2+})$/% | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ | $E(B_2O_3)$/% |
|---|---|---|---|---|---|---|---|---|---|
| Extraction | 5:1 | 54.63 | 2.52 | 0.24 | 0.0052 | 46.50 | 2.65 | 123.40 | 53.23 |

| | A/O | $S(Li^+)$/% | $S(Mg^{2+})$/% | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ | $S(B_2O_3)$/% |
|---|---|---|---|---|---|---|---|---|---|
| Stripping | 1:9.5 | 75.72 | 38.46 | 29.36 | 5.95 | 4.93 | 6.72 | 1.35 | 81.99 |

TABLE 17

Two-phase separation profile of $Li^+$, $Mg^{2+}$ and $B_2O_3$ in the brine of a salt lake in Qinghai province by a complex solvent of N-pentyl isopelargonamide, N-cyclopentyl pelargonamide and 2-propyl heptanol

|  | O/A | $E(Li^+)/$ % | $E(Mg^{2+})/$ % | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ | $E(B_2O_3)/$ % |
|---|---|---|---|---|---|---|---|---|---|
| Extraction | 5:1 | 57.52 | 5.56 | 0.27 | 0.012 | 22.99 | 5.48 | 125.99 | 50.54 |

|  | A/O | $S(Li^+)/$ % | $S(Mg^{2+})/$ % | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ | $S(B_2O_3)/$ % |
|---|---|---|---|---|---|---|---|---|---|
| Stripping | 1:5 | 73.74 | 46.08 | 14.15 | 4.31 | 3.28 | 11.25 | 3.42 | 89.51 |

As can be seen from Table 17, the single-stage extraction rate of $Li^+$ was 57.52%, the single-stage extraction rate of $Mg^{2+}$ was 5.56%, the separation coefficient of lithium and magnesium was 22.99. The single-stage stripping rate of $Li^+$ was 73.74%, the single-stage stripping rate of $Mg^{2+}$ was 46.08%, the separation coefficient of lithium and magnesium after stripping was 3.28, and the mass ratio of magnesium to lithium in the water phase was reduced to 3.42. The single-stage extraction rate of $B_2O_3$ was 50.54%, and the single-stage stripping rate of $B_2O_3$ was 89.51%.

Embodiment 18

12 mL N-isooctyl valeramide, 2 mL N-ethyl lauramide (liquid after heating) and 6 mL 2-hexyl decanol were placed together into a 100 mL ground conical flask as the extractants, with the alkyl alcohol accounting for 30% the volume of the organic phase, into which was then added 2 mL magnesium-containing brine, wherein the volume ratio of the organic phase to the brine was 10:1. In the magnesium-containing brine, the contents of $Li^+$, $Mg^{2+}$, $Cl^-$ and $B_2O_3$ were 20.42, 99.83, 399.07 and 0.50 g/L respectively, the mass ratio of magnesium to lithium was 4.89:1, the density of brine was 1.32 g/cm$^3$, the pH value was adjusted to 0.0 with concentrated hydrochloric acid. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 25 min. The mixed liquid was then transferred into a 100 mL plastic test tube, and centrifuged in a LD5-10 benchtop centrifuge at a rotational speed of 4000 r/min for 10 min. When the interface was clear, the two phases were separated to get a post-extraction loaded organic phase and a remaining brine phase. The loaded organic phase was transferred into another 100 mL ground conical flask, into which was added deionized water at a volume ratio of 1:10 to the organic phase. The ground conical flask was placed in a DF-101S heat collecting type thermostat magnetic stirrer for stripping and two-phase mixing at 20° C. for 25 min. The mixed liquid was then transferred into a 100 mL plastic test tube, and centrifuged in a LD5-10 benchtop centrifuge at a rotational speed of 4200 r/min for 10 min to get a post-stripping organic phase and a water phase.

Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing into analytical solutions, sampling and analyzing the contents of $Li^+$, $Mg^{2+}$ and $B_2O_3$, thus calculating the experimental results as shown in Table 18.

TABLE 18

Two-phase separation profile of $Li^+$, $Mg^{2+}$ and $B_2O_3$ in the certain magnesium-containing brine by a complex solvent of N-isooctyl valeramide, N-ethyl lauramide and 2-hexyl decanol

|  | O/A | $E(Li^+)/$ % | $E(Mg^{2+})/$ % | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ | $E(B_2O_3)/$ % |
|---|---|---|---|---|---|---|---|---|---|
| Extraction | 10:1 | 39.92 | 2.42 | 0.059 | 0.0025 | 23.80 | 0.30 | 7.94 | 43.66 |

|  | A/O | $S(Li^+)/$ % | $S(Mg^{2+})/$ % | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ | $S(B_2O_3)/$ % |
|---|---|---|---|---|---|---|---|---|---|
| Stripping | 1:10 | 82.43 | 84.29 | 48.19 | 55.18 | 0.87 | 0.26 | 0.30 | 91.45 |

As can be seen from Table 18, the single-stage extraction rate of $Li^+$ was 39.92%, the single-stage extraction rate of $Mg^{2+}$ was 2.42%, the separation coefficient of lithium and magnesium was 23.80. The single-stage stripping rate of $Li^+$ was 82.43%, the single-stage stripping rate of $Mg^{2+}$ was 84.29%, the separation coefficient of lithium and magnesium after stripping was 0.87, and the mass ratio of magnesium to lithium in the water phase was reduced to 0.30. The single-stage extraction rate of $B_2O_3$ was 43.66%, and the single-stage stripping rate of $B_2O_3$ was 91.45%.

Embodiment 19

12 mL N-isopentyl caprylamide and 3 mL 2-propyl heptanol were added into a 100 mL ground conical flask as the extractants, with the alkyl alcohol accounting for 20% the volume of the organic phase, into which was then added 5 mL magnesium-containing brine, wherein the volume ratio of the organic phase to the brine was 3:1. In the magnesium-containing brine, the contents of $Li^+$, $Mg^{2+}$, $Cl^-$ and $B_2O_3$ were 0.11, 120.62, 358.58 and 1.89 g/L respectively, the mass ratio of magnesium to lithium was 1096.55:1, the density of brine was 1.33 $g/cm^3$, the pH value was adjusted to 0.76 with concentrated hydrochloric acid. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 100 mL plastic test tube, and centrifuged in a LD5-10 benchtop centrifuge at a rotational speed of 4000 r/min for 8 min. When the interface was clear, the two phases were separated to get a post-extraction loaded organic phase and a remaining brine phase. The loaded organic phase was transferred into another 100 mL ground conical flask, into which was added deionized water at a volume ratio of 1:3 to the organic phase. The ground conical flask was placed in a DF-101S heat collecting type thermostat magnetic stirrer for stripping and two-phase mixing at 20° C. for 30 min. The mixed liquid was then transferred into a 100 mL plastic test tube, and centrifuged in a LD5-10 benchtop centrifuge at a rotational speed of 4000 r/min for 8 min to get a post-stripping organic phase and a water phase.

Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing into analytical solutions, sampling and analyzing the contents of $Li^+$, $Mg^{2+}$ and $B_2O_3$, thus calculating the experimental results as shown in Table 19.

As can be seen from Table 19, the single-stage extraction rate of $Li^+$ was 73.31%, the single-stage extraction rate of $Mg^{2+}$ was 1.58%, the separation coefficient of lithium and magnesium was 170.71. The single-stage stripping rate of $Li^+$ is 96.75%, the single-stage stripping rate of $Mg^{2+}$ is 96.63%, the separation coefficient of lithium and magnesium after stripping was 1.04, and the mass ratio of magnesium to lithium in the water phase was reduced to 23.60. The single-stage extraction rate of $B_2O_3$ was 46.90%, and the single-stage stripping rate of $B_2O_3$ was 93.47%.

Embodiment 20

23.85 mL N-isooctyl butyramide, 2.0 mL N-isooctyl neo-capramide, 1.0 mL N-isooctyl-1-cyclopropyl carboxamide, 3.0 mL 3-octanol as the extractants, and 0.15 mL 260# solvent oil as the diluent, were added into a 100 mL ground conical flask, with the alkyl alcohol and the diluent accounting for 10% and 0.5% the volume of the organic phase respectively, into which was then added 3 mL dilution of salt lake brine of Embodiment 7, the volume ratio of the organic phase to the brine was 10:1. Then, the contents of $Li^+$, $Mg^{2+}$, $Cl^-$ and $B_2O_3$ in the brine were 3.67, 82.09, 241.84 and 12.37 g/L respectively, the mass ratio of magnesium to lithium was 22.37:1, the density of brine was 1.25 $g/cm^3$, and the pH value was adjusted to 2.0 with concentrated hydrochloric acid. A magneton was put into the conical flask, which was placed in a DF-101S heat collecting type thermostat magnetic stirrer, mixed with stirring at 20° C. and extracted for 30 min. The mixed liquid was then transferred into a 100 mL plastic test tube, and centrifuged in a LD5-10 benchtop centrifuge at a rotational speed of 4200 r/min for 8 min. When the interface was clear, the two phases were separated to get a post-extraction loaded organic phase and a remaining brine phase. The loaded organic phase was transferred into another 100 mL ground conical flask, into which was added deionized water at a volume ratio of 1:10 to the organic phase. The ground conical flask was placed in a DF-101S heat collecting type thermostat magnetic stirrer for stripping and two-phase mixing at 20° C. for 30 min. The mixed liquid was then transferred into a 100 mL plastic test tube, which was centrifuged in a LD5-10 benchtop centrifuge at a rotational speed of 4200 r/min for 8 min to get a post-stripping organic phase and a water phase.

Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing into analytical solutions, sampling and analyzing the contents of $Li^+$, $Mg^{2+}$ and $B_2O_3$, thus calculating the experimental results as shown in Table 20.

TABLE 19

Two-phase separation profile of $Li^+$, $Mg^{2+}$ and $B_2O_3$ in the certain magnesium-containing brine by a complex solvent of N-isopentyl caprylamide and 2-propyl heptanol

| | O/A | $E(Li^+)/$ % | $E(Mg^{2+})/$ % | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ | $E(B_2O_3)/$ % |
|---|---|---|---|---|---|---|---|---|---|
| Extraction | 3:1 | 73.31 | 1.58 | 0.91 | 0.0054 | 170.71 | 23.63 | 4043.54 | 46.90 |

| | A/O | $S(Li^+)/$ % | $S(Mg^{2+})/$ % | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ | $S(B_2O_3)/$ % |
|---|---|---|---|---|---|---|---|---|---|
| Stripping | 1:3 | 96.75 | 86.63 | 91.09 | 87.58 | 1.04 | 24.51 | 23.60 | 93.47 |

TABLE 20

Two-phase separation profile of $Li^+$, $Mg^{2+}$ and $B_2O_3$ in the brine of a salt lake in Qinghai province by a complex system of N-isooctyl butyramide, N-isooctyl neo-capramide, N-isooctyl-1-cyclopropyl carboxamide, 3-octanol and 260# solvent oil

|  | O/A | $E(Li^+)/\%$ | $E(Mg^{2+})/\%$ | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ | $E(B_2O_3)/\%$ |
|---|---|---|---|---|---|---|---|---|---|
| Extraction | 10:1 | 43.56 | 0.75 | 0.077 | 0.00076 | 101.98 | 0.39 | 39.33 | 50.53 |

|  | A/O | $S(Li^+)/\%$ | $S(Mg^{2+})/\%$ | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ | $S(B_2O_3)/\%$ |
|---|---|---|---|---|---|---|---|---|---|
| Stripping | 1:10 | 86.58 | 78.07 | 65.81 | 36.33 | 1.81 | 0.63 | 0.35 | 74.86 |

As can be seen from Table 20, the single-stage extraction rate of $Li^+$ was 43.56%, the single-stage extraction rate of $Mg^{2+}$ was 0.75%, the separation coefficient of lithium and magnesium was 101.98. The single-stage stripping rate of $Li^{2+}$ was 86.58%, the single-stage stripping rate of $Mg^{2+}$ was 78.07%, the separation coefficient of lithium and magnesium after stripping was 1.81, and the mass ratio of magnesium to lithium in the water phase was reduced to 0.35. The single-stage extraction rate of $B_2O_3$ was 50.53%, and the single-stage stripping rate of $B_2O_3$ was 74.86%.

Embodiment 21

4.5 mL N-isopentyl caprylamide, 4.5 mL N-isooctyl valeramide and 1.0 mL 2-propyl heptanol as the extractants were added into a 100 mL ground conical flask, with the alkyl alcohol accounting for 10% the volume of the organic phase, into which was then added 10 mL magnesium-containing brine, wherein the volume ratio of the organic phase to the brine was 1:1. In the magnesium-containing brine, the contents of $Li^+$, $Mg^{2+}$, $Cl^-$ and $B_2O_3$ were 0.19, 117.27, 343.25 and 1.62 g/L respectively, the mass ratio of magnesium to lithium was 627.43:1, the density of brine was 1.32 g/cm³, and the pH value of the brine was adjusted to 2.2. A magneton was put into the conical flask, which was placed in a DF-101S heat collecting type thermostat magnetic stirrer, mixed with stirring at 20° C. and extracted for 30 min. The mixed liquid was then transferred into a 100 mL plastic test tube, and centrifuged in a LD5-10 benchtop centrifuge at a rotational speed of 4200 r/min for 10 min. When the interface was clear, the two phases were separated to get a post-extraction loaded organic phase and a remaining brine phase. The loaded organic phase was transferred into another 100 mL ground conical flask, into which was added deionized water at a volume ratio of 1:1 to the organic phase. The ground conical flask was placed in a DF-101S heat collecting type thermostat magnetic stirrer for stripping and two-phase mixing at 20° C. for 30 min. The mixed liquid was then transferred into a 100 mL plastic test tube, and centrifuged in a LD5-10 benchtop centrifuge at a rotational speed of 4200 r/min for 10 min to get a post-stripping organic phase and a water phase.

Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing into analytical solutions, sampling and analyzing the contents of $Li^+$, $Mg^{2+}$ and $B_2O_3$, thus calculating the experimental results as shown in Table 21.

TABLE 21

Two-phase separation profile of $Li^+$, $Mg^{2+}$ and $B_2O_3$ in the certain magnesium-containing brine by a complex solvent of N-isopentyl caprylamide, N-isooctyl valeramide and 2-propyl heptanol

|  | O/A | $E(Li^+)/\%$ | $E(Mg^{2+})/\%$ | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ | $E(B_2O_3)/\%$ |
|---|---|---|---|---|---|---|---|---|---|
| Extraction | 1:1 | 54.34 | 3.93 | 1.19 | 0.041 | 29.10 | 45.38 | 1319.96 | 20.73 |

|  | A/O | $S(Li^+)/\%$ | $S(Mg^{2+})/\%$ | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ | $S(B_2O_3)/\%$ |
|---|---|---|---|---|---|---|---|---|---|
| Stripping | 1:1 | 95.66 | 76.52 | 21.41 | 3.16 | 6.78 | 246.27 | 36.31 | 94.34 |

As can be seen from Table 21, the single-stage extraction rate of $Li^+$ was 54.34%, the single-stage extraction rate of $Mg^{2+}$ was 3.93%, the separation coefficient of lithium and magnesium was 29.10. The single-stage stripping rate of $Li^+$ is 95.66%, the single-stage stripping rate of $Mg^{2+}$ was 76.52%, the separation coefficient of lithium and magnesium after stripping was 6.78, and the mass ratio of magnesium to lithium in the water phase was reduced to 36.31. The single-stage extraction rate of $B_2O_3$ was 20.73%, and the single-stage stripping rate of $B_2O_3$ was 94.34%.

Embodiment 22

15 mL N-isooctyl butyramide and 15 mL 2-octyl dodecanol were added into a 100 mL ground conical flask as the extractants, with the alkyl alcohol accounting for 50% the volume of the organic phase, into which was then added 3 mL salt lake brine of Embodiment 1, the pH value was adjusted to 2.0 with concentrated hydrochloric acid, the volume ratio of the organic phase to the brine was 10:1. The conical flask was inserted with a polytetrafluoroethylene stirring rod, which was stirred by a DW-1-60 direct-current constant speed stirrer to mix at 50° C. and extract for 30 min. The mixed liquid was then allowed to settle naturally for 60 min. After the separation of two phases, a post-extraction loaded organic phase and a remaining brine phase were obtained. The loaded organic phase was transferred into another 100 mL ground conical flask, into which was added deionized water at a volume ratio of 1:10 to the organic phase. A polytetrafluoroethylene stirring rod was inserted into the ground conical flask and stirred by a DW-1-60 direct-current constant speed stirrer at 50° C. for stripping and two-phase mixing for 30 min. The mixed liquid was then allowed to settle naturally for 60 min. After the separation of two phases, a post-stripping organic phase and a water phase were obtained.

Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing into analytical solutions, sampling and analyzing the contents of $Li^+$, $Mg^{2+}$ and $B_2O_3$, thus calculating the experimental results as shown in Table 22.

after stripping was 3.64, and the mass ratio of magnesium to lithium in the water phase was reduced to 1.33. The single-stage extraction rate of $B_2O_3$ was 83.66%, and the single-stage stripping rate of $B_2O_3$ was 60.84%.

Embodiment 23

In brine from a salt lake in the Chaidamu basin of Qinghai province, the contents of $Li^+$ and $Mg^{2+}$ were 0.31 g/L and 105.72 g/L respectively, the mass ratio of magnesium to lithium was 341.26:1, wherein the contents of $Na^+$, $K^+$, $Cl^-$, $SO_4^{2-}$ and $B_2O_3$ were 5.16, 3.32, 313.09, 11.13 and 1.16 g/L respectively, the density of brine was 1.31 $g/cm^3$, and the pH value was adjusted to 2.0 with concentrated hydrochloric acid. 3 mL of this brine was added into a 100 mL ground conical flask, into which was then added 13 mL N-isooctyl valeramide, 2 mL N-dodecyl acetamide (liquid after heating), 9 mL 2-butyl octanol as the extractants and 6 mL 260# solvent oil as the diluent, with the alkyl alcohol and the diluent accounting for 30% and 20% the volume of the organic phase respectively, wherein the volume ratio of the organic phase to the salt lake brine was 10:1. A magneton was put into the conical flask, which was placed in a DF-101S heat collecting type thermostat magnetic stirrer, mixed with stirring at 20° C. and extracted for 25 min. The mixed liquid was then transferred into a 100 mL plastic test tube, and centrifuged in a LD5-10 benchtop centrifuge at a rotational speed of 4200 r/min for 8 min. When the interface was clear, the two phases were separated to get a post-extraction loaded organic phase and a remaining brine phase. The loaded organic phase was transferred into another 100 mL ground conical flask, into which was added deionized water at a volume ratio of 1:20 to the organic phase. The ground conical flask was placed in a DF-101S heat collecting type thermostat magnetic stirrer for stripping and two-phase mixing at 20° C. for 25 min. The mixed liquid was then transferred into a 100 mL plastic test tube, which was centrifuged in a LD5-10 benchtop centrifuge at a rotational speed of 4200 r/min for 8 min to get a post-stripping organic phase and a water phase.

Japan Shimadzu AA-7000 Atomic Absorption Spectrophotometer standard addition method, an EDTA titration

TABLE 22

Two-phase separation profile of $Li^+$, $Mg^{2+}$ and $B_2O_3$ in the brine of a salt lake in Qinghai province by a complex solvent of N-isooctyl butyramide and 2-octyl dodecanol

| | O/A | $E(Li^+)$/% | $E(Mg^{2+})$/% | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ | $E(B_2O_3)$/% |
|---|---|---|---|---|---|---|---|---|---|
| Extraction | 10:1 | 34.98 | 1.23 | 0.054 | 0.0012 | 43.21 | 2.01 | 86.74 | 83.66 |
| | A/O | $S(Li^+)$/% | $S(Mg^{2+})$/% | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ | $S(B_2O_3)$/% |
| Stripping | 1:10 | 80.71 | 53.52 | 44.06 | 12.09 | 3.64 | 4.85 | 1.33 | 60.84 |

As can be seen from Table 22, the single-stage extraction rate of $Li^+$ was 34.98%, the single-stage extraction rate of $Mg^{2+}$ was 1.23%, the separation coefficient of lithium and magnesium was 43.21. The single-stage stripping rate of $Li^+$ was 80.71%, the single-stage stripping rate of $Mg^{2+}$ was 53.52%, the separation coefficient of lithium and magnesium method and a mannitol method were respectively used, keeping the brine phase and the water phase in the processes of extraction and stripping in constant volume, preparing into analytical solutions, sampling and analyzing the contents of $Li^+$, $Mg^{2+}$ and $B_2O_3$, thus calculating the experimental results as shown in Table 23.

TABLE 23

Two-phase separation profile of Li$^+$, Mg$^{2+}$ and B$_2$O$_3$ in the brine of a salt lake in Qinghai province by a complex system of N-isooctyl valeramide, N-dodecyl acetamide, 2-butyl octanol and 260# solvent oil

| | O/A | E(Li$^+$)/% | E(Mg$^{2+}$)/% | D(Li$^+$) | D(Mg$^{2+}$) | β(Li$^+$/Mg$^{2+}$) | m$_o$(Mg$^{2+}$)/m$_o$(Li$^+$) | m$_w$(Mg$^{2+}$)/m$_w$(Li$^+$) | E(B$_2$O$_3$)/% |
|---|---|---|---|---|---|---|---|---|---|
| Extraction | 10:1 | 36.36 | 0.90 | 0.057 | 0.00090 | 63.05 | 8.45 | 531.41 | 65.40 |
| | A/O | S(Li$^+$)/% | S(Mg$^{2+}$)/% | D$_s$(Li$^+$) | D$_s$(Mg$^{2+}$) | β$_s$(Li$^+$/Mg$^{2+}$) | m$_{so}$(Mg$^{2+}$)/m$_{so}$(Li$^+$) | m$_{sw}$(Mg$^{2+}$)/m$_{sw}$(Li$^+$) | S(B$_2$O$_3$)/% |
| Stripping | 1:20 | 93.65 | 94.65 | 296.28 | 355.00 | 0.83 | 7.12 | 8.54 | 67.79 |

As can be seen from Table 23, the single-stage extraction rate of Li$^+$ was 36.36%, the single-stage extraction rate of Mg$^{2+}$ was 0.90%, the separation coefficient of lithium and magnesium was 63.05. The single-stage stripping rate of Li$^+$ is 93.65%, the single-stage stripping rate of Mg$^{2+}$ is 94.65%, the separation coefficient of lithium and magnesium after stripping was 0.83, and the mass ratio of magnesium to lithium in the water phase was reduced to 8.54. The single-stage extraction rate of B$_2$O$_3$ was 65.40%, and the single-stage stripping rate of B$_2$O$_3$ was 67.79%.

Embodiment 24

14.9 mL N-isooctyl valeramide, 0.1 g N-cyclododecyl acetamide (mixed liquid after heating), 14.85 mL 2-propyl heptanol as the extractants and 0.15 mL 260# solvent oil as the diluent were added into a 100 mL ground conical flask, with the alkyl alcohol and the diluent accounting for 49.5% and 0.5% the volume of the organic phase respectively, into which was then added 3 mL salt lake brine of Embodiment 23, the pH value was adjusted to 2.0 with concentrated hydrochloric acid, the volume ratio of the organic phase to the brine was 10:1. A magneton was put into the conical flask, which was placed in a DF-101S heat collecting type thermostat magnetic stirrer, mixed with stirring at 20° C. and extracted for 25 min. The mixed liquid was then transferred into a 100 mL plastic test tube, which was centrifuged in a LD5-10 benchtop centrifuge at a rotational speed of 4200 r/min for 8 min. When the interface was clear, the two phases were separated to get a post-extraction loaded organic phase and a remaining brine phase. The loaded organic phase was transferred into another 100 mL ground conical flask, into which was added deionized water at a volume ratio of 1:20 to the organic phase. The ground conical flask was placed in a DF-101S heat collecting type thermostat magnetic stirrer for stripping and two-phase mixing at 20° C. for 25 min. The mixed liquid was then transferred into a 100 mL plastic test tube, and centrifuged in a LD5-10 benchtop centrifuge at a rotational speed of 4200 r/min for 8 min to get a post-stripping organic phase and a water phase.

Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing into analytical solutions, sampling and analyzing the contents of Li$^+$, Mg$^{2+}$ and B$_2$O$_3$, thus calculating the experimental results as shown in Table 24.

TABLE 24

Two-phase separation profile of Li$^+$, Mg$^{2+}$ and B$_2$O$_3$ in the brine of a salt lake in Qinghai province by a complex system of N-isooctyl valeramide, N-cyclododecyl acetamide, 2-propyl heptanol and 260# solvent oil

| | O/A | E(Li$^+$)/% | E(Mg$^{2+}$)/% | D(Li$^+$) | D(Mg$^{2+}$) | β(Li$^+$/Mg$^{2+}$) | m$_o$(Mg$^{2+}$)/m$_o$(Li$^+$) | m$_w$(Mg$^{2+}$)/m$_w$(Li$^+$) | E(B$_2$O$_3$)/% |
|---|---|---|---|---|---|---|---|---|---|
| Extraction | 10:1 | 31.72 | 0.91 | 0.046 | 0.00092 | 50.43 | 9.81 | 495.25 | 65.37 |
| | A/O | S(Li$^+$)/% | S(Mg$^{2+}$)/% | D$_s$(Li$^+$) | D$_s$(Mg$^{2+}$) | β$_s$(Li$^+$/Mg$^{2+}$) | m$_{so}$(Mg$^{2+}$)/m$_{so}$(Li$^+$) | m$_{sw}$(Mg$^{2+}$)/m$_{sw}$(Li$^+$) | S(B$_2$O$_3$)/% |
| Stripping | 1:20 | 92.61 | 93.54 | 251.26 | 289.98 | 0.87 | 8.58 | 9.90 | 64.45 |

As can be seen from Table 24, the single-stage extraction rate of $Li^+$ was 31.72%, the single-stage extraction rate of $Mg^{2+}$ was 0.91%, the separation coefficient of lithium and magnesium was 50.43. The single-stage stripping rate of $Li^+$ is 92.61%, the single-stage stripping rate of $Mg^{2+}$ is 93.54%, the separation coefficient of lithium and magnesium after stripping was 0.87, and the mass ratio of magnesium to lithium in the water phase was reduced to 9.90. The single-stage extraction rate of $B_2O_3$ was 65.37%, and the single-stage stripping rate of $B_2O_3$ was 64.45%.

Embodiment 25

18 mL N-isooctyl valeramide, 1 mL N-cyclopropyl capramide (liquid after heating), 1 mL N-hexyl-3-cyclopentyl propanamide and 5 mL 2-octyl dodecanol were added into a 100 mL ground conical flask as the extractants, with the alkyl alcohol accounting for 20% the volume of the organic phase, into which was then added 5 mL salt lake brine of Embodiment 1, the pH value was adjusted to 2.0 with concentrated hydrochloric acid, the volume ratio of the organic phase to the brine was 5:1. A magneton was put into the conical flask, which was placed in a DF-101S heat collecting type thermostat magnetic stirrer, mixed with stirring at 20° C. and extracted for 25 min. The mixed liquid was then transferred into a 100 mL plastic test tube, and centrifuged in a LD5-10 benchtop centrifuge at a rotational speed of 4200 r/min for 8 min. When the interface was clear, the two phases were separated to get a post-extraction loaded organic phase and a remaining brine phase. The loaded organic phase was transferred into another 100 mL ground conical flask, into which was added deionized water at a volume ratio of 1:5 to the organic phase. The ground conical flask was placed in a DF-101S heat collecting type thermostat magnetic stirrer for stripping and two-phase mixing at 20° C. for 25 min. The mixed liquid was then transferred into a 100 mL plastic test tube, which was centrifuged in a LD5-10 benchtop centrifuge at a rotational speed of 4200 r/min for 8 min to get a post-stripping organic phase and a water phase.

Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing into analytical solutions, sampling and analyzing the contents of $Li^+$, $Mg^{2+}$ and $B_2O_3$, thus calculating the experimental results as shown in Table 25.

As can be seen from Table 25, the single-stage extraction rate of $Li^+$ was 57.14%, the single-stage extraction rate of $Mg^{2+}$ was 1.60%, the separation coefficient of lithium and magnesium was 81.96. The single-stage stripping rate of $Li^+$ is 94.09%, the single-stage stripping rate of $Mg^{2+}$ is 91.69%, the separation coefficient of lithium and magnesium after stripping was 1.45, and the mass ratio of magnesium to lithium in the water phase was reduced to 1.56. The single-stage extraction rate of $B_2O_3$ was 41.02%, and the single-stage stripping rate of $B_2O_3$ was 92.37%.

Embodiment 26

24 mL N-isooctyl valeramide and 6 mL 2-propyl heptanol were added into a 100 mL ground conical flask as the extractants, with the alkyl alcohol accounting for 20% the volume of the organic phase, into which was then added 5 mL magnesium-containing brine, wherein the volume ratio of the organic phase to the brine was 6:1. In the magnesium-containing brine, the contents of $Li^+$, $Mg^{2+}$, $Cl^-$, $SO_4^{2-}$ and $B_2O_3$ were 1.21, 80.86, 202.53, 53.56 and 1.23 g/L respectively, the mass ratio of magnesium to lithium was 66.83:1, the density of brine was 1.25 g/cm$^3$, and the pH value of the brine was 7.0. A magneton was put into the conical flask, which was placed in a DF-101S heat collecting type thermostat magnetic stirrer, mixed with stirring at 20° C. and extracted for 25 min. The mixed liquid was then transferred into a 100 mL plastic test tube, which was centrifuged in a LD5-10 benchtop centrifuge at a rotational speed of 4200 r/min for 8 min to get a post-extraction loaded organic phase and a remaining brine phase. The loaded organic phase was transferred into another 100 mL ground conical flask, into which was added deionized water at a volume ratio of 1:6 to the organic phase. The ground conical flask was placed in a DF-101S heat collecting type thermostat magnetic stirrer for stripping and two-phase mixing at 20° C. for 25 min. The mixed liquid was then transferred into a 100 mL plastic test tube, which was centrifuged in a LD5-10 benchtop centrifuge at a rotational speed of 4200 r/min for 8 min to get a post-stripping organic phase and a water phase.

Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing into analytical solutions, sampling and analyzing the contents of $Li^+$, $Mg^{2+}$ and $B_2O_3$, thus calculating the experimental results as shown in Table 26.

TABLE 25

Two-phase separation profile of $Li^+$, $Mg^{2+}$ and $B_2O_3$ in the brine of a salt lake in Qinghai province by a complex solvent of N-isooctyl valeramide, N-cyclopropyl capramide, N-hexyl-3-cyclopentyl propanamide and 2-octyl dodecanol

| | O/A | E($Li^+$)/% | E($Mg^{2+}$)/% | D($Li^+$) | D($Mg^{2+}$) | β($Li^+$/$Mg^{2+}$) | $m_o$($Mg^{2+}$)/$m_o$($Li^+$) | $m_w$($Mg^{2+}$)/$m_w$($Li^+$) | E($B_2O_3$)/% |
|---|---|---|---|---|---|---|---|---|---|
| Extraction | 5:1 | 57.14 | 1.60 | 0.27 | 0.0033 | 81.96 | 1.60 | 131.09 | 41.02 |
| | A/O | S($Li^+$)/% | S($Mg^{2+}$)/% | $D_s$($Li^+$) | $D_s$($Mg^{2+}$) | $β_s$($Li^+$/$Mg^{2+}$) | $m_{so}$($Mg^{2+}$)/$m_{so}$($Li^+$) | $m_{sw}$($Mg^{2+}$)/$m_{sw}$($Li^+$) | S($B_2O_3$)/% |
| Stripping | 1:5 | 94.09 | 91.69 | 80.73 | 55.82 | 1.45 | 2.25 | 1.56 | 92.37 |

TABLE 26

Two-phase separation profile of Li$^+$, Mg$^{2+}$ and B$_2$O$_3$ in the certain
magnesium-containing brine by a complex solvent of N-isooctyl valeramide and 2-propyl heptanol

|  | O/A | E(Li$^+$)/% | E(Mg$^{2+}$)/% | D(Li$^+$) | D(Mg$^{2+}$) | β(Li$^+$/Mg$^{2+}$) | m$_o$(Mg$^{2+}$)/m$_o$(Li$^+$) | m$_w$(Mg$^{2+}$)/m$_w$(Li$^+$) | E(B$_2$O$_3$)/% |
|---|---|---|---|---|---|---|---|---|---|
| Extraction | 6:1 | 31.81 | 1.17 | 0.078 | 0.019 | 39.93 | 2.43 | 96.86 | 11.68 |
|  | A/O | S(Li$^+$)/% | S(Mg$^{2+}$)/% | D$_s$(Li$^+$) | D$_s$(Mg$^{2+}$) | β$_s$(Li$^+$/Mg$^{2+}$) | m$_{so}$(Mg$^{2+}$)/m$_{so}$(Li$^+$) | m$_{sw}$(Mg$^{2+}$)/m$_{sw}$(Li$^+$) | S(B$_2$O$_3$)/% |
| Stripping | 1:6 | 71.69 | 82.50 | 15.15 | 28.27 | 0.54 | 1.52 | 2.83 | 94.11 |

As can be seen from Table 26, the single-stage extraction rate of Li$^+$ was 31.81%, the single-stage extraction rate of Mg$^{2+}$ was 1.17%, the separation coefficient of lithium and magnesium was 39.93. The single-stage stripping rate of Li$^+$ was 71.69%, the single-stage stripping rate of Mg$^{2+}$ was 82.50%, the separation coefficient of lithium and magnesium after stripping was 0.54, and the mass ratio of magnesium to lithium in the water phase was reduced to 2.83. The single-stage extraction rate of B$_2$O$_3$ was 11.68%, and the single-stage stripping rate of B$_2$O$_3$ was 94.11%.

Embodiment 27

13.9 mL N-isooctyl valeramide, 1 mL N-dodecyl acetamide (liquid after heating), 0.1 g N-(4-t-butyl cyclohexyl) caprylamide, 3 mL 2-butyl octanol as the extractants and 12 mL 260# solvent oil as the diluent were added into a 100 mL ground conical flask, with the alkyl alcohol and the diluent accounting for 10% and 40% the volume of the organic phase respectively. Into the ground conical flask was then added 3 mL salt lake brine of Embodiment 23, the pH value was adjusted to 1.3 with concentrated hydrochloric acid, and the volume ratio of the organic phase to the brine was 10:1. A magneton was put into the conical flask, which was placed in DF-101S heat collecting type thermostat magnetic stirrer, mixed with stirring at 25° C. and extracted for 30 min. The mixed liquid was then transferred into a 100 mL plastic test tube, which was centrifuged in a LD5-10 benchtop centrifuge at a rotational speed of 4200 r/min for 8 min to get a post-extraction loaded organic phase and a remaining brine phase. The loaded organic phase was transferred into another 100 mL ground conical flask, into which was added deionized water at a volume ratio of 1:20 to the organic phase. The ground conical flask was placed in a DF-101S heat collecting type thermostat magnetic stirrer for stripping and two-phase mixing at 25° C. for 30 min. The mixed liquid was then transferred into a 100 mL plastic test tube, and centrifuged in a LD5-10 benchtop centrifuge at a rotational speed of 4200 r/min for 8 min to get a post-stripping organic phase and a water phase.

Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing into analytical solutions, sampling and analyzing the contents of Li$^+$, Mg$^{2+}$ and B$_2$O$_3$, thus calculating the experimental results as shown in Table 27.

TABLE 27

Two-phase separation profile of Li$^+$, Mg$^{2+}$ and B$_2$O$_3$ in the brine of a salt lake in
Qinghai province by a complex system of N-isooctyl valeramide, N-dodecyl acetamide,
N-(4-t-butyl cyclohexyl) caprylamide, 2-butyl octanol and 260# solvent oil

|  | O/A | E(Li$^+$)/% | E(Mg$^{2+}$)/% | D(Li$^+$) | D(Mg$^{2+}$) | β(Li$^+$/Mg$^{2+}$) | m$_o$(Mg$^{2+}$)/m$_o$(Li$^+$) | m$_w$(Mg$^{2+}$)/m$_w$(Li$^+$) | E(B$_2$O$_3$)/% |
|---|---|---|---|---|---|---|---|---|---|
| Extraction | 10:1 | 45.52 | 1.73 | 0.083 | 0.0018 | 47.44 | 12.98 | 615.58 | 44.20 |
|  | A/O | S(Li$^+$)/% | S(Mg$^{2+}$)/% | D$_s$(Li$^+$) | D$_s$(Mg$^{2+}$) | β$_s$(Li$^+$/Mg$^{2+}$) | m$_{so}$(Mg$^{2+}$)/m$_{so}$(Li$^+$) | m$_{sw}$(Mg$^{2+}$)/m$_{sw}$(Li$^+$) | S(B$_2$O$_3$)/% |
| Stripping | 1:20 | 90.66 | 96.40 | 287.62 | 537.34 | 0.54 | 5.08 | 13.75 | 78.54 |

As can be seen from Table 27, the single-stage extraction rate of Li$^+$ was 45.52%, the single-stage extraction rate of Mg$^{2+}$ was 1.73%, the separation coefficient of lithium and magnesium was 47.44. The single-stage stripping rate of Li$^+$ is 90.66%, the single-stage stripping rate of Mg$^{2+}$ is 96.40%, the separation coefficient of lithium and magnesium after stripping was 0.54, and the mass ratio of magnesium to lithium in the water phase was reduced to 13.75. The single-stage extraction rate of B$_2$O$_3$ was 44.20%, and the single-stage stripping rate of B$_2$O$_3$ was 78.54%.

Embodiment 28

24.5 mL N-isooctyl valeramide, 0.25 mL N-ethyl-1-(4-pentyl cyclohexyl) carboxamide and 0.25 mL 2-butyl octanol were added into a 100 mL ground conical flask as the extractants, wherein the secondary amide accounting for 99% the volume of the organic phase, and the alkyl alcohol accounting for 1% the volume of the organic phase. Into the ground conical flask was then added 5 mL salt lake brine of Embodiment 23, the pH value was adjusted to 1.3 with concentrated hydrochloric acid, the volume ratio of the organic phase to the brine was 5:1. A magneton was put into the conical flask, which was placed in a DF-101S heat collecting type thermostat magnetic stirrer, mixed with stirring at 25° C. and extracted for 25 min. The mixed liquid was then transferred into a 100 mL plastic test tube, and centrifuged in a LD5-10 benchtop centrifuge at a rotational speed of 4300 r/min for 15 min to get a post-extraction loaded organic phase and a remaining brine phase. The loaded organic phase was transferred into another 100 mL ground conical flask, into which was added deionized water at a volume ratio of 1:5 to the organic phase. The ground conical flask was placed in a DF-101S heat collecting type thermostat magnetic stirrer for stripping and two-phase mixing at 25° C. for 25 min. The mixed liquid was then transferred into a 100 mL plastic test tube, and centrifuged in a LD5-10 benchtop centrifuge at a rotational speed of 4300 r/min for 15 min to get a post-stripping organic phase and a water phase.

Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing into analytical solutions, sampling and analyzing the contents of Li$^+$, Mg$^{2+}$ and B$_2$O$_3$, thus calculating the experimental results as shown in Table 28.

magnesium was 53.33. The single-stage stripping rate of Li$^+$ was 88.51%, the single-stage stripping rate of Mg$^{2+}$ was 75.65%, the separation coefficient of lithium and magnesium after stripping was 2.48, and the mass ratio of magnesium to lithium in the water phase was reduced to 16.13. The single-stage extraction rate of B$_2$O$_3$ was 29.42%, and the single-stage stripping rate of B$_2$O$_3$ was 82.21%. When the volume proportion of secondary amide extractant in the organic phase is high, it is more favorable for the extraction of Li$^+$ in the brine.

Embodiment 29

0.2 mL N-isooctyl heptamide and 19.8 mL 2-propyl heptanol were added into a 100 mL ground conical flask as the extractants, wherein the secondary amide accounting for 1% the volume of the organic phase, and the alkyl alcohol accounting for 99% the volume of the organic phase. Into the ground conical flask was then added 5 mL salt lake brine of Embodiment 1, the pH value was adjusted to 2.0 with sulfuric acid, the volume ratio of the organic phase to the brine was 4:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 10 min. When the interface was clear, the two phases were separated to get a post-extraction loaded organic phase and a remaining brine phase. The loaded organic phase was transferred into another 100 mL ground conical flask, into which was added deionized water at a volume ratio of 1:4 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 10 min to get a post-stripping organic phase and a water phase.

Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing

TABLE 28

Two-phase separation profile of Li$^+$, Mg$^{2+}$ and B$_2$O$_3$ in the brine of a salt lake in Qinghai province by a complex solvent of N-isooctyl valeramide, N-ethyl-1-(4-pentyl cyclohexyl) carboxamide and 2-butyl octanol

| Extraction | O/A | E(Li$^+$)/% | E(Mg$^{2+}$)/% | D(Li$^+$) | D(Mg$^{2+}$) | β(Li$^+$/Mg$^{2+}$) | m$_o$(Mg$^{2+}$)/m$_o$(Li$^+$) | m$_w$(Mg$^{2+}$)/m$_w$(Li$^+$) | E(B$_2$O$_3$)/% |
|---|---|---|---|---|---|---|---|---|---|
| | 5:1 | 67.33 | 3.72 | 0.41 | 0.0077 | 53.33 | 18.86 | 1005.70 | 29.42 |
| Stripping | A/O | S(Li$^+$)/% | S(Mg$^{2+}$)/% | D$_s$(Li$^+$) | D$_s$(Mg$^{2+}$) | β$_s$(Li$^+$/Mg$^{2+}$) | m$_{so}$(Mg$^{2+}$)/m$_{so}$(Li$^+$) | m$_{sw}$(Mg$^{2+}$)/m$_{sw}$(Li$^+$) | S(B$_2$O$_3$)/% |
| | 1:5 | 88.51 | 75.65 | 40.58 | 16.37 | 2.48 | 39.98 | 16.13 | 82.21 |

As can be seen from Table 28, the single-stage extraction rate of Li$^+$ was 67.33%, the single-stage extraction rate of Mg$^{2+}$ was 3.72%, the separation coefficient of lithium and into analytical solutions, sampling and analyzing the contents of Li$^+$, Mg$^{2+}$ and B$_2$O$_3$, thus calculating the experimental results as shown in Table 29.

TABLE 29

Two-phase separation profile of $Li^+$, $Mg^{2+}$ and $B_2O_3$ in the brine of a salt lake in Qinghai province by a complex solvent of N-isooctyl heptamide and 2-propyl heptanol

| | O/A | $E(Li^+)$/% | $E(Mg^{2+})$/% | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ | $E(B_2O_3)$/% |
|---|---|---|---|---|---|---|---|---|---|
| Extraction | 4:1 | 5.48 | 0.78 | 0.015 | 0.0020 | 7.38 | 8.07 | 59.49 | 92.02 |
| | A/O | $S(Li^+)$/% | $S(Mg^{2+})$/% | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ | $S(B_2O_3)$/% |
| Stripping | 1:4 | 36.40 | 39.36 | 2.29 | 2.60 | 0.88 | 7.69 | 8.72 | 40.34 |

As can be seen from Table 29, the single-stage extraction rate of $Li^+$ was 5.48%, the single-stage extraction rate of $Mg^{2+}$ was 0.78%, the separation coefficient of lithium and magnesium was 7.38. The single-stage stripping rate of $Li^+$ was 36.40%, the single-stage stripping rate of $Mg^{2+}$ was 39.36%, the separation coefficient of lithium and magnesium after stripping was 0.88, and the mass ratio of magnesium to lithium in the water phase was reduced to 8.72. The single-stage extraction rate of $B_2O_3$ was 92.02%, and the single-stage stripping rate of $B_2O_3$ was 40.34%. When the volume proportion of alkyl alcohol extractant in the organic phase is high, it is more favorable for the extraction of $B_2O_3$ in the brine.

Embodiment 30

5 mL salt lake brine of Embodiment 1 was added into a 100 mL ground conical flask, the pH value was adjusted to 2.0 with concentrated hydrochloric acid, into which was then added 0.42 g ferric trichloride hexahydrate at a purity of 99% to dissolve before additionally adding 15 mL N-isooctyl valeramide and 5 mL 3, 5, 5-trimethyl hexanol as the extractants, wherein the alkyl alcohol accounted for 25% the volume of the organic phase, and the volume ratio of the organic phase to the brine was 4:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 10 min. When the interface was clear, the two phases were separated to get a post-extraction loaded organic phase and a remaining brine phase. The loaded organic phase was transferred into another 100 mL ground conical flask, into which was added deionized water at a volume ratio of 1:4 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 10 min to get a post-stripping organic phase and a water phase.

Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing into analytical solutions, sampling and analyzing the contents of $Li^+$, $Mg^{2+}$ and $B_2O_3$, thus calculating the experimental results as shown in Table 30.

TABLE 30

Two-phase separation profile of $Li^+$, $Mg^{2+}$ and $B_2O_3$ in a $Fe^{3+}$-containing brine of a salt lake in Qinghai province by a complex solvent of N-isooctyl valeramide and 3, 5, 5-trimethyl hexanol

| | O/A | $E(Li^+)$/% | $E(Mg^{2+})$/% | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ | $E(B_2O_3)$/% |
|---|---|---|---|---|---|---|---|---|---|
| Extraction | 4:1 | 68.73 | 3.38 | 0.55 | 0.0088 | 62.77 | 2.79 | 175.10 | 59.58 |
| | A/O | $S(Li^+)$/% | $S(Mg^{2+})$/% | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ | $S(B_2O_3)$/% |
| Stripping | 1:4 | 83.11 | 45.60 | 19.63 | 3.34 | 5.88 | 8.99 | 1.53 | 92.44 |

As can be seen from Table 30, the single-stage extraction rate of Li$^+$ was 68.73%, the single-stage extraction rate of Mg$^{2+}$ was 3.38%, the separation coefficient of lithium and magnesium was 62.77. The single-stage stripping rate of Li$^+$ was 83.11%, the single-stage stripping rate of Mg$^{2+}$ was 45.60%, the separation coefficient of lithium and magnesium after stripping was 5.88, and the mass ratio of magnesium to lithium in the water phase was reduced to 1.53. The single-stage extraction rate of B$_2$O$_3$ was 59.58%, and the single-stage stripping rate of B$_2$O$_3$ was 92.44%.

Embodiment 31

5 mL salt lake brine of Embodiment 1 was added into a 100 mL ground conical flask, the pH value was adjusted to 2.0 with concentrated hydrochloric acid, into which was then added 0.30 g ferrous chloride tetrahydrate at a purity of 99% to dissolve before additionally adding 15 mL N-isooctyl valeramide and 5 mL 2-butyl octanol as the extractants, wherein the alkyl alcohol accounted for 25% the volume of the organic phase, and the volume ratio of the organic phase to the brine was 4:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4500 r/min for 10 min. When the interface was clear, the two phases were separated to get a post-extraction loaded organic phase and a remaining brine phase. The loaded organic phase was transferred into another 100 mL ground conical flask, into which was added deionized water at a volume ratio of 1:4 to the organic phase. The ground conical flask was placed in a DF-101S heat collecting type thermostat magnetic stirrer for stripping and two-phase mixing at 20° C. for 30 min. The mixed liquid was then transferred into a 250 mL plastic test tube, and centrifuged in a LD5-10 benchtop centrifuge at a rotational speed of 4500 r/min for 10 min to get a post-stripping organic phase and a water phase.

Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing into analytical solutions, sampling and analyzing the contents of Li$^+$, Mg$^{2+}$ and B$_2$O$_3$, thus calculating the experimental results as shown in Table 31.

41.40%, the separation coefficient of lithium and magnesium after stripping was 3.72, and the mass ratio of magnesium to lithium in the water phase was reduced to 1.73. The single-stage extraction rate of B$_2$O$_3$ was 56.60%, and the single-stage stripping rate of B$_2$O$_3$ was 93.64%.

Embodiment 32

20 mL N-isooctyl isovaleramide and 5 mL 2-propyl heptanol were added into a 100 mL ground conical flask as the extractants, with the alkyl alcohol accounting for 20% the volume of the organic phase, into which was then added 5 mL salt lake brine of Embodiment 1, the pH value was adjusted to 2.0 with concentrated hydrochloric acid, and the volume ratio of the organic phase to the brine was 5:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 250 mL plastic test tube, and centrifuged in a LD5-10 benchtop centrifuge at a rotational speed of 4800 r/min for 15 min. When the interface was clear, the two phases were separated to get a post-extraction loaded organic phase and a remaining brine phase. A three-stage countercurrent extraction was then conducted according to extraction cascade crossover operation steps to get a loaded organic phase and a remaining brine phase after the three-stage countercurrent extraction.

The loaded organic phase after the three-stage countercurrent extraction was transferred into another 100 mL ground conical flask, into which was then added deionized water at a volume ratio of 1:5 to the organic phase. The ground conical flask was placed in a DF-101S heat collecting type thermostat magnetic stirrer for single-stage stripping and two-phase mixing at 20° C. for 30 min. The mixed liquid was then transferred into a 250 mL plastic test tube, and centrifuged in a LD5-10 benchtop centrifuge at a rotational speed of 4800 r/min for 15 min to get a post-stripping organic phase and a water phase. A two-stage countercurrent stripping was then conducted according to cascade crossover operation steps to get an organic phase and a water phase after the two-stage countercurrent stripping.

Japan Shimadzu AA-7000 Atomic Absorption Spectrophotometer standard addition method, an EDTA titration method and a mannitol method were respectively used,

TABLE 31

Two-phase separation profile of Li$^+$, Mg$^{2+}$ and B$_2$O$_3$ in a Fe$^{3+}$-containing brine of a salt lake in Qinghai province by a complex solvent of N-isooctyl valeramide and 2-butyl octanol

| | O/A | E(Li$^+$)/% | E(Mg$^{2+}$)/% | D(Li$^+$) | D(Mg$^{2+}$) | β(Li$^+$/Mg$^{2+}$) | m$_o$(Mg$^{2+}$)/m$_o$(Li$^+$) | m$_w$(Mg$^{2+}$)/m$_w$(Li$^+$) | E(B$_2$O$_3$)/% |
|---|---|---|---|---|---|---|---|---|---|
| Extraction | 4:1 | 55.63 | 2.97 | 0.31 | 0.0077 | 40.93 | 3.03 | 123.93 | 56.60 |
| | A/O | S(Li$^+$)/% | S(Mg$^{2+}$)/% | D$_s$(Li$^+$) | D$_s$(Mg$^{2+}$) | β$_s$(Li$^+$/Mg$^{2+}$) | m$_{so}$(Mg$^{2+}$)/m$_{so}$(Li$^+$) | m$_{sw}$(Mg$^{2+}$)/m$_{sw}$(Li$^+$) | S(B$_2$O$_3$)/% |
| Stripping | 1:4 | 72.40 | 41.40 | 10.45 | 2.81 | 3.72 | 6.43 | 1.73 | 93.64 |

As can be seen from Table 31, the single-stage extraction rate of Li$^+$ was 55.63%, the single-stage extraction rate of Mg$^{2+}$ was 2.97%, the separation coefficient of lithium and magnesium was 40.93. The single-stage stripping rate of Li$^+$ was 72.40%, the single-stage stripping rate of Mg$^{2+}$ was keeping the brine phase and the water phase in the processes of extraction and stripping in constant volume, preparing into analytical solutions, sampling and analyzing the contents of Li$^+$, Mg$^{2+}$ and B$_2$O$_3$, thus calculating the experimental results as shown in Table 32.

TABLE 32

Three-stage countercurrent extraction and two-stage countercurrent stripping profiles of $Li^+$, $Mg^{2+}$ and $B_2O_3$ in the brine of a salt lake in Qinghai province by a complex solvent of N-isooctyl isovaleramide and 2-propyl heptanol

| | O/A | E(Li$^+$)/% | E(Mg$^{2+}$)/% | D(Li$^+$) | D(Mg$^{2+}$) | β(Li$^+$/Mg$^{2+}$) | $m_o$(Mg$^{2+}$)/$m_o$(Li$^+$) | $m_w$(Mg$^{2+}$)/$m_w$(Li$^+$) | E(B$_2$O$_3$)/% |
|---|---|---|---|---|---|---|---|---|---|
| Three-stage Countercurrent Extraction | 5:1 | 76.42 | 2.47 | 0.65 | 0.0051 | 127.94 | 1.83 | 234.45 | 80.95 |

| | A/O | S(Li$^+$)/% | S(Mg$^{2+}$)/% | $D_s$(Li$^+$) | $D_s$(Mg$^{2+}$) | $β_s$(Li$^+$/Mg$^{2+}$) | $m_{so}$(Mg$^{2+}$)/$m_{so}$(Li$^+$) | $m_{sw}$(Mg$^{2+}$)/$m_{sw}$(Li$^+$) | S(B$_2$O$_3$)/% |
|---|---|---|---|---|---|---|---|---|---|
| Two-stage Countercurrent Stripping | 1:5 | 92.65 | 72.10 | 63.03 | 12.92 | 4.88 | 6.95 | 1.43 | 95.47 |

As can be seen from Table 32, after a three-stage countercurrent extraction of brine, the extraction rate of $Li^+$ was 76.42%, the extraction rate of $Mg^{2+}$ was 2.47%, the separation coefficient of lithium and magnesium reached 127.94. After a two-stage countercurrent stripping of the loaded organic phase, the stripping rate of $Li^+$ was 92.65%, the stripping rate of $Mg^{2+}$ was 72.10%, the separation coefficient of lithium and magnesium after stripping was 4.88, the mass ratio of magnesium to lithium in the water phase was reduced to 1.43, and $Li^+$ and $Mg^{2+}$ in the brine were effectively separated. Wherein, after a three-stage countercurrent of the brine, the extraction rate of $B_2O_3$ was 80.95%, the two-stage countercurrent stripping rate of $B_2O_3$ was 95.47%, indicating that the extraction system can extracting both $Li^+$ and $B_2O_3$ effectively at the same time. The more stages of the multi-stage countercurrent extraction, the higher the extraction rates of lithium and boron in the brine, and the larger the separation coefficient of lithium and magnesium. In the case of reduced consumption of water phase, the more stage in the multi-stage countercurrent stripping, the more beneficial it is to the increase of the concentrations of $Li^+$ and $B_2O_3$ in the post-stripping water phase.

The post-stripping organic phase is returned to the pre-extraction brine phase and remixed to realize the recycling of the extractants.

The water phase solution obtained after stripping was then subjected to oil removal and secondary evaporation, thus being concentrated to a $Li^+$ concentration of 30 g/L. After then, solutions of calcium chloride and barium chloride were separately added to completely precipitate and remove the sulfate radicals therein, and solutions of sodium carbonate and sodium hydroxide were separately added to completely precipitate and remove $Mg^{2+}$ therein. Then, the remaining solution was allowed to be evaporated, concentrated, cooled, crystallized, filtered and dried to get anhydrous lithium chloride product.

The concentrate of lithium chloride obtained after impurity removal was placed in an ion-exchange membrane electrolyzer for electrolysis. A lithium hydroxide solution with a mass concentration of 12% was obtained at the cathode, which was concentrated and crystallized to get a lithium hydroxide monohydrate. The lithium hydroxide monohydrate was washed with water and dried to get an anhydrous lithium hydroxide product, as well as the byproducts hydrogen gas and chlorine gas, which further react with each other to produce hydrochloric acid.

Embodiment 33

5 mL salt lake brine of Embodiment 1 was added into a 100 mL ground conical flask, the pH value was adjusted to 2.0 with concentrated hydrochloric acid, into which was then added 0.41 g ferric trichloride hexahydrate at a purity of 99% to dissolve before additionally adding 15 mL N-isooctyl valeramide and 5 mL 2-butyl octanol as the extractants, wherein the alkyl alcohol accounted for 25% the volume of the organic phase, and the volume ratio of the organic phase to the brine was 4:1. A magneton was put into the conical flask, at the mouth of which was inserted a matched air condensing tube to prevent the liquid from spilling out. The conical flask was placed in a DF-101S heat collecting type thermostat magnetic stirrer, mixed with stirring at 20° C. and extracted for 30 min. The mixed liquid was then transferred into a 100 mL plastic test tube, and centrifuged in a LD5-10 benchtop centrifuge at a rotational speed of 4500 r/min for 10 min. When the interface was clear, the two phases were separated to get a post-extraction loaded organic phase and a remaining brine phase. The loaded organic phase was transferred into another 100 mL ground conical flask, into which was added deionized water at a volume ratio of 1:4 to the organic phase. The ground conical flask was placed in a DF-101S heat collecting type thermostat magnetic stirrer for stripping and two-phase mixing at 20° C. for 30 min. The mixed liquid was then transferred into a 100 mL plastic test tube, and centrifuged in a LD5-10 benchtop centrifuge at a rotational speed of 4500 r/min for 10 min to get a post-stripping organic phase and a water phase.

Japan Shimadzu AA-7000 Atomic Absorption Spectrophotometer standard addition method, an EDTA titration method and a mannitol method were respectively used, keeping the brine phase and the water phase in the processes of extraction and stripping in constant volume, preparing into analytical solutions, sampling and analyzing the contents of $Li^+$, $Mg^{2+}$ and $B_2O_3$, thus calculating the experimental results as shown in Table 33.

TABLE 33

Two-phase separation profile of $Li^+$, $Mg^{2+}$ and $B_2O_3$ in a $Fe^{3+}$-containing brine of a salt lake in Qinghai province by a complex solvent of N-isooctyl valeramide and 2-butyl octanol

| | O/A | $E(Li^+)$/% | $E(Mg^{2+})$/% | $D(Li^+)$ | $D(Mg^{2+})$ | $\beta(Li^+/Mg^{2+})$ | $m_o(Mg^{2+})/m_o(Li^+)$ | $m_w(Mg^{2+})/m_w(Li^+)$ | $E(B_2O_3)$/% |
|---|---|---|---|---|---|---|---|---|---|
| Extraction | 4:1 | 71.43 | 6.21 | 0.63 | 0.017 | 37.77 | 4.93 | 186.04 | 50.61 |
| | A/O | $S(Li^+)$/% | $S(Mg^{2+})$/% | $D_s(Li^+)$ | $D_s(Mg^{2+})$ | $\beta_s(Li^+/Mg^{2+})$ | $m_{so}(Mg^{2+})/m_{so}(Li^+)$ | $m_{sw}(Mg^{2+})/m_{sw}(Li^+)$ | $S(B_2O_3)$/% |
| Stripping | 1:4 | 74.91 | 35.82 | 11.72 | 2.19 | 5.35 | 12.61 | 2.36 | 92.82 |

As can be seen from Table 33, the single-stage extraction rate of $Li^+$ was 71.43%, the single-stage extraction rate of $Mg^{2+}$ was 6.21%, the separation coefficient of lithium and magnesium was 37.77. The single-stage stripping rate of $Li^+$ was 74.91%, the single-stage stripping rate of $Mg^{2+}$ was 35.82%, the separation coefficient of lithium and magnesium after stripping was 5.35, and the mass ratio of magnesium to lithium in the water phase was reduced to 2.36. The single-stage extraction rate of $B_2O_3$ was 50.61%, and the single-stage stripping rate of $B_2O_3$ was 92.82%.

The brine was subjected to three-stage countercurrent extraction and two-stage countercurrent stripping under the same conditions. The water phase solution obtained after stripping was then subjected to oil removal and secondary evaporation, thus being concentrated to a $Li^+$ concentration of 20 g/L. After then, solutions of calcium chloride and barium chloride were separately added to completely precipitate and remove the sulfate radicals therein, and solutions of sodium carbonate and sodium hydroxide were separately added to completely precipitate and remove $Mg^{2+}$ therein, to get a refined solution of lithium chloride. A solution of sodium carbonate at a concentration of 250 g/L was then added at 1.1 times the theoretical amount thereof, producing a lithium carbonate precipitate, which was filtered and dried to get a lithium carbonate product.

An emulsion of calcium hydroxide was added into the obtained lithium carbonate, heated and stirred intensely for solid-liquid reaction to produce a solution of lithium hydroxide and a precipitate of calcium carbonate. After the separation of two phases, a solution of lithium hydroxide was obtained, which was concentrated at reduced pressure, crystallized and dried at 130 to 140° C. to produce lithium hydroxide monohydrate, and then heated at 150 to 180° C. and at reduced pressure to produce an anhydrous lithium hydroxide product.

The foregoing are only some implementation cases provided for the selection of the invention, and the implementation mode of the invention shall not be limited to the above embodiments. For technicians in the field, various modifications and changes can be made to the disclosure. Any modifications, equivalent replacements, combinations and improvements made within the spirit and principle of the invention as well as various changes in form and detail according to this shall be all included in the scope of the invention.

TABLE 34

Common designations, corresponding Canonical Names and Codes of substances of Class A, secondary amides, referred in the Embodiments

| Nos. | Common Designations of Partial Substances of Class A, Secondary Amides | Corresponding Canonical Names of Partial Substances of Class A, Secondary Amides | Codes |
|---|---|---|---|
| 1 | N-isooctyl butyramide | N-(2-ethyl hexyl) n-butyramide | Z842 |
| 2 | N-octyl isobutyramide | N-n-octyl-2-methyl propanamide | Z843 |
| 3 | N-isobutyl isopelargonamide | N-(2-methyl propyl)-3, 5, 5-trimethyl caproamide | Z494 |
| 4 | N-isopentyl caprylamide | N-(3-methyl butyl) n-caprylamide | Z582 |
| 5 | N-isooctyl valeramide | N-(2-ethyl hexyl) n-valeramide | Z852 |
| 6 | N-isooctyl isovaleramide | N-(2-ethyl hexyl)-3-methyl butyramide | Z854 |
| 7 | N-ethyllauramide | N-ethyl n-dodecanamide | Z2121 |
| 8 | N-pentyl isopelargonamide | N-n-pentyl-3, 5, 5-trimethyl caproamide | Z593 |
| 9 | N-dodecyl acetamide | N-n-dodecyl acetamide | Z1221 |
| 10 | N-isooctyl heptamide | N-(2-ethylhexyl)-n-heptamide | Z872 |
| 11 | N-isooctyl caprylamide | N-(2-ethylhexyl)-n-caprylamide | Z882 |
| 12 | N-isooctyl neo-capramide | N-(2-ethyl hexyl)-7, 7-dimethyl caprylamide | Z8104 |
| 13 | N-isooctyl-1-cyclopropyl carboxamide | N-(2-ethyl hexyl)-1-cyclopropyl carboxamide | Z84h2 |
| 14 | N-cyclopropyl capramide | N-cyclopropyl n-capramide | Z3h101 |
| 15 | N-ethyl-1-(4-pentyl cyclohexyl) carboxamide | N-ethyl-1-(4-n-pentyl cyclohexyl) carboxamide | Z212h1 |
| 16 | N-cyclopentyl pelargonamide | N-cyclopentyl n-pelargonamide | Z5h91 |
| 17 | N-hexyl-3-cyclopentyl propanamide | N-n-hexyl-3-cyclopentyl propanamide | Z68h1 |
| 18 | N-cyclododecyl acetamide | N-cyclododecyl acetamide | Z12h21 |
| 19 | N-(4-t-butyl cyclohexyl) caprylamide | N-(4-t-butyl cyclohexyl) n-caprylamide | Z10h82 |

TABLE 35

Common designations, corresponding Canonical Names and CAS Nos. of substances of Class B, alkyl alcohols, referred in the Embodiments*

| Nos. | Common Designations of Partial Substances of Class B, Alkyl alcohols | Corresponding Canonical Names of Partial Substances of Class B, Alkyl alcohols | CAS Nos. |
|---|---|---|---|
| 1 | 3-octanol | 3-octanol | 589-98-0 |
| 2 | Diisobutyl methanol | 2, 6-dimethyl-4-heptanol | 108-82-7 |
| 3 | 3, 5, 5-trimethyl hexanol | 3, 5, 5-trimethyl-1-hexanol | 3452-97-9 |
| 4 | 2-propyl heptanol | 2-n-propyl-1-heptanol | 10042-59-8 |
| 5 | 2, 6-dimethyl-2-octanol | 2, 6-dimethyl-2-octanol | 18479-57-7 |
| 6 | 2-butyl octanol | 2-n-butyl-1-octanol | 3913-02-8 |
| 7 | 2-hexyl decanol | 2-n-hexyl-1-decanol | 2425-77-6 |
| 8 | 2-heptyl undecanol | 2-n-heptyl-1-undecanol | 5333-44-8 |
| 9 | 2-octyl dodecanol | 2-n-octyl-1-dodecanol | 5333-42-6 |

*CAS Nos. refer to registration numbers in Chemical Abstract Service.

What is claimed is:

1. An extraction method for separating magnesium and extracting lithium and boron from magnesium-containing brine with a complex solvent of secondary amide/alkyl alcohol, wherein, it comprises the following steps:
    S1. The magnesium-containing brine is taken as a pre-extraction brine phase; wherein, in the magnesium-containing brine, the concentration of lithium ions is 0.1~21 g/L, the concentration of magnesium ions is 80~125 g/L, the concentration of chloride ions is 200~400 g/L, the mass ratio of magnesium to lithium is 4.8~1100:1, the concentration of boric acid and borate ions is 0.5~20 g/L totally on the basis of $B_2O_3$, the density of brine at 20° C. is 1.25~1.38 $g/cm^3$, and the pH value of the brine is adjusted to 0~7 with hydrochloric acid or sulfuric acid;
    S2. The complex solvent of secondary amide/alkyl alcohol is taken as a pre-extraction organic phase;
    S3. The pre-extraction organic phase and the pre-extraction brine phase are mixed at a volume ratio of 1~10:1, and subjected to a single-stage extraction or a multi-stage countercurrent extraction, then subjected to a two-phase separation to get a loaded organic phase and a post-extraction brine phase;
    S4. With water as a stripping agent, the loaded organic phase is subjected to a single-stage stripping or a multi-stage countercurrent stripping, the ratio of stripping phases, i.e., the volume ratio of the stripping agent to the loaded organic phase, is 1:1~20, then the two phases are separated to get a post-stripping organic phase and a post-stripping water phase;
    wherein, in the step S4, the stripping temperature is 0~50° C.; the two phases are mixed with stirring; after the stripping, the two phases are separated by centrifugation or settlement;
    S5. The post-stripping organic phase is returned to the step S2 to realize the recycling of the complex solvent;
    S6. The post-stripping water phase is further purified and concentrated; boric acid is precipitated from the solution, washed and dried to produce a boric acid product;
    S7. An agent for removing impurities is added into the lithium-containing solution after the precipitation of boric acid to remove the sulfate radicals and remaining magnesium ions therein, to get a refined lithium chloride solution; the agent for removing impurities is one or two or more of calcium oxide, calcium hydroxide, calcium chloride, barium chloride, sodium carbonate, sodium oxalate or sodium hydroxide;
    S8. The refined lithium chloride solution is subjected to concentration, crystallization, separation and drying to produce a lithium chloride product.

2. The extraction method for separating magnesium and extracting lithium and boron from magnesium-containing brine with a complex solvent of secondary amide/alkyl alcohol according to claim 1, wherein, the magnesium-containing brine also comprises one or two or more of sodium ions, potassium ions, ferric ions, ferrous ions or sulfate radicals.

3. The extraction method for separating magnesium and extracting lithium and boron from magnesium-containing brine with a complex solvent of secondary amide/alkyl alcohol according to claim 1, wherein, the magnesium-containing brine comprises lithium and boron-containing salt lake brine.

4. The extraction method for separating magnesium and extracting lithium and boron from magnesium-containing brine with a complex solvent of secondary amide/alkyl alcohol according to claim 1, wherein, in the step S3, the extraction temperature is 0~50° C.; the two phases are mixed with stirring; after the extraction, the two phases are separated by centrifugation or settlement.

5. The extraction method for separating magnesium and extracting lithium and boron from magnesium-containing brine with a complex solvent of secondary amide/alkyl alcohol according to claim 1 in obtaining a lithium product lithium hydroxide, wherein, after the step S7, it further comprises the following steps:
    S10. The refined lithium chloride solution is subjected to electrolysis, to produce a lithium hydroxide product; meanwhile the byproducts hydrogen gas and chlorine gas can be used in the production of hydrochloric acid;
    Or after the step S7, it further comprises the following steps:
    S9. To the refined lithium chloride solution is added sodium carbonate to get a lithium carbonate precipitate, which is separated and dried to produce a lithium carbonate product;
    S11. To the obtained lithium carbonate is added a calcium hydroxide emulsion for a solid-liquid reaction, then separated to get a lithium hydroxide solution, which is concentrated, crystallized and dried to produce a lithium hydroxide product.

6. The extraction method for separating magnesium and extracting lithium and boron from magnesium-containing brine with a complex solvent of secondary amide/alkyl alcohol according to claim 1, wherein the complex solvent comprises substances of classes A and B; wherein the substances of class A are secondary amides consisting of a single compound or a mixture of two or more compounds; wherein, the single compound has a structure as shown in Formula (I):

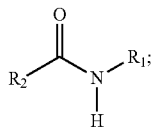

(I)

wherein, $R_1$ is selected from a C2~C12 alkyl or a C3~C12 cycloalkyl containing a single-ring structure, $R_2$ is selected from a C1~C11 alkyl or a C3~C11 cycloalkyl containing a single-ring structure, and the sum of the number of carbon atoms contained in the two groups $R_1$ and $R_2$ is 11~17, wherein the alkyl or the cycloalkyl comprises various isomers; when $R_1$ and $R_2$ are well-determined, the substances of class A are a single compound, while the mixture means a substance mixed by two or more compounds generated as a result of the variations of $R_1$ and $R_2$;

wherein the substances of class B are alkyl alcohols consisting of a single compound or a mixture of two or more compounds; wherein, the single compound has a structure as shown in Formula (II):

$$R_3-OH \qquad (II);$$

wherein, $R_3$ is selected from a C8~C20 alkyl, wherein the alkyl comprises various linear or branched isomers; when $R_3$ is well-determined, the substances of class B are a single compound, while the mixture means a substance mixed by two or more compounds generated as a result of the variations of $R_3$;

the complex solvent comprising substances of classes A and B has a freezing point less than 0° C.;

wherein, the substances of class A are mainly used for extracting lithium, accounting for a volume percentage of 0~100% in the whole organic phase, not including two endpoint values; the substances of class B are mainly used for extracting boron, accounting for a volume percentage of 0~100% in the whole organic phase, not including two endpoint values;

wherein, the substances of class A account for a volume percentage of 50~90% in the whole organic phase, and the substances of class B account for a volume percentage of 10~50% in the whole organic phase;

wherein, it further comprises a diluent 260 # solvent oil, 300 # solvent oil or sulfonated kerosene which act as diluents.

* * * * *